United States Patent
Lockhart et al.

(10) Patent No.: US 9,591,295 B2
(45) Date of Patent: *Mar. 7, 2017

(54) APPROACHES FOR SIMULATING THREE-DIMENSIONAL VIEWS

(71) Applicant: Amazon Technologies, Inc., Reno, NV (US)

(72) Inventors: Christopher Wayne Lockhart, Seattle, WA (US); Kevin Robert Costello, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 224 days.

This patent is subject to a terminal disclaimer.

(21) Appl. No.: 14/035,918

(22) Filed: Sep. 24, 2013

(65) Prior Publication Data

US 2015/0085076 A1    Mar. 26, 2015

(51) Int. Cl.
*H04N 13/04* (2006.01)
*G06F 3/048* (2013.01)

(52) U.S. Cl.
CPC ........ *H04N 13/0468* (2013.01); *G06F 3/048* (2013.01); *H04N 2213/006* (2013.01)

(58) Field of Classification Search
CPC ............... G06F 3/048; H04N 13/0468; H04N 2213/006; H04N 13/00; H04N 13/02; H04N 13/04

(Continued)

(56) References Cited

U.S. PATENT DOCUMENTS 4,695,130 A * 9/1987 Medina .............. G02B 27/2207
359/464
5,574,836 A * 11/1996 Broemmelsiek ........ G06F 3/012
345/421

(Continued)

FOREIGN PATENT DOCUMENTS

WO    WO 2009/155688    12/2009
WO    WO 2015/048086    4/2015
WO    WO 2015/048529    4/2015

OTHER PUBLICATIONS

International Search Report and Written Opinion received for PCT/US2014/057146, mailed on Dec. 24, 2014, 12 pages.

(Continued)

*Primary Examiner* — Shan Elahi
(74) *Attorney, Agent, or Firm* — Polsinelli LLP

(57) ABSTRACT

Approaches enable display of image content (e.g., still or video content), providing an appearance or view based at least in part upon a current relative position and/or orientation of the viewer with respect to the device, and changes in that relative position and/or orientation. Image content is rendered consistent with a viewing angle for the current relative position of the viewer. As that viewing angle changes, the content can be re-rendered or otherwise updated to display the image content from a perspective that reflects the change in viewing angle. Different adjustments can be applied to portions of the content based upon the change in viewing angle. These adjustments can include changes due to parallax or occlusion, which when added to the rendered content enhance the viewer experience and increase realism for content rendered on a two- or three-dimensional display screen.

19 Claims, 14 Drawing Sheets

(58) Field of Classification Search
USPC .......................................................... 348/46
See application file for complete search history.

(56) References Cited

U.S. PATENT DOCUMENTS

| | | | | |
|---|---|---|---|---|
| 5,751,927 | A * | 5/1998 | Wason | G06F 3/04815 |
| | | | | 345/419 |
| 5,777,720 | A * | 7/1998 | Shapiro | G02B 27/0093 |
| | | | | 348/E13.022 |
| 6,023,277 | A | 2/2000 | Osaka et al. | |
| 6,701,306 | B1 * | 3/2004 | Kronmiller et al. | 707/797 |
| 6,985,145 | B2 | 1/2006 | Knighton et al. | |
| 7,428,001 | B2 * | 9/2008 | Schowengerdt et al. | 348/51 |
| 7,439,975 | B2 * | 10/2008 | Hsu | 345/426 |
| 7,626,569 | B2 * | 12/2009 | Lanier | G06F 1/1601 |
| | | | | 345/156 |
| 7,688,317 | B2 | 3/2010 | Berger | |
| 7,817,163 | B2 | 10/2010 | Hanggie et al. | |
| 8,345,046 | B2 | 1/2013 | Norrby | |
| 8,406,571 | B2 * | 3/2013 | Weinberger | G06K 9/32 |
| | | | | 382/274 |
| 8,427,746 | B2 * | 4/2013 | Si | H04N 13/0418 |
| | | | | 345/4 |
| 8,451,344 | B1 * | 5/2013 | Karakotsios | H04N 5/772 |
| | | | | 348/211.11 |
| 8,502,817 | B2 | 8/2013 | Deb et al. | |
| 8,508,475 | B2 * | 8/2013 | Gear | G06F 1/1626 |
| | | | | 345/157 |
| 8,570,320 | B2 | 10/2013 | Izadi et al. | |
| 8,589,488 | B2 * | 11/2013 | Huston | G06Q 30/0207 |
| | | | | 455/456.1 |
| 8,970,625 | B2 * | 3/2015 | Chavez | G06F 3/012 |
| | | | | 345/419 |
| 9,201,568 | B2 * | 12/2015 | Chavez | G06F 3/012 |
| 9,224,237 | B2 | 12/2015 | Costello et al. | |
| 9,299,183 | B2 * | 3/2016 | Vesely | G06F 3/012 |
| 9,354,718 | B2 * | 5/2016 | Vesely | G06F 3/0325 |
| 2002/0000988 | A1 * | 1/2002 | Nelson | G06T 11/40 |
| | | | | 345/443 |
| 2002/0114078 | A1 * | 8/2002 | Halle | G02B 3/0056 |
| | | | | 359/619 |
| 2004/0105004 | A1 * | 6/2004 | Rui | H04N 7/181 |
| | | | | 348/159 |
| 2004/0223218 | A1 * | 11/2004 | Putilin | G02B 27/2214 |
| | | | | 359/462 |
| 2005/0146787 | A1 * | 7/2005 | Lukyanitsa | G02B 27/2214 |
| | | | | 359/462 |
| 2005/0232587 | A1 | 10/2005 | Strawn et al. | |
| 2007/0002045 | A1 | 1/2007 | Finger et al. | |
| 2007/0188603 | A1 * | 8/2007 | Riederer | G02B 21/22 |
| | | | | 348/54 |
| 2007/0229654 | A1 * | 10/2007 | Kusuno | H04N 13/0411 |
| | | | | 348/51 |
| 2007/0291035 | A1 * | 12/2007 | Vesely | G06F 3/011 |
| | | | | 345/427 |
| 2008/0030504 | A1 | 2/2008 | Brunner et al. | |
| 2008/0246759 | A1 | 10/2008 | Summers | |
| 2009/0066786 | A1 * | 3/2009 | Landa | G02B 27/22 |
| | | | | 348/54 |
| 2009/0147073 | A1 * | 6/2009 | Getty | A61B 6/466 |
| | | | | 348/51 |
| 2010/0039380 | A1 * | 2/2010 | Lanier | G06F 1/1601 |
| | | | | 345/156 |
| 2010/0125816 | A1 | 5/2010 | Bezos | |
| 2010/0177170 | A1 * | 7/2010 | Kusuno | H04N 13/0447 |
| | | | | 348/51 |
| 2010/0315414 | A1 * | 12/2010 | Lowe | G06F 3/012 |
| | | | | 345/419 |
| 2011/0007135 | A1 * | 1/2011 | Okada | G11B 27/322 |
| | | | | 348/46 |
| 2011/0025825 | A1 * | 2/2011 | McNamer | H04N 13/0221 |
| | | | | 348/46 |
| 2011/0025830 | A1 * | 2/2011 | McNamer | H04N 13/021 |
| | | | | 348/50 |
| 2011/0084893 | A1 * | 4/2011 | Lee | G06F 1/1649 |
| | | | | 345/6 |
| 2011/0115890 | A1 * | 5/2011 | Kim | G02B 27/2264 |
| | | | | 348/56 |
| 2011/0122127 | A1 * | 5/2011 | Ko | H04N 13/0029 |
| | | | | 345/419 |
| 2011/0128555 | A1 * | 6/2011 | Rotschild | G02B 27/2271 |
| | | | | 356/625 |
| 2011/0157309 | A1 * | 6/2011 | Bennett | G06F 3/14 |
| | | | | 348/43 |
| 2011/0157315 | A1 * | 6/2011 | Bennett | G06F 3/14 |
| | | | | 348/46 |
| 2011/0157327 | A1 * | 6/2011 | Seshadri | G06F 3/14 |
| | | | | 348/51 |
| 2011/0164111 | A1 * | 7/2011 | Karaoguz | G06F 3/14 |
| | | | | 348/43 |
| 2011/0164188 | A1 * | 7/2011 | Karaoguz | G06F 3/011 |
| | | | | 348/734 |
| 2011/0221599 | A1 * | 9/2011 | Hogasten | H01L 27/14609 |
| | | | | 340/632 |
| 2011/0248987 | A1 * | 10/2011 | Mitchell | G06T 15/20 |
| | | | | 345/419 |
| 2011/0255775 | A1 * | 10/2011 | McNamer | G06T 7/0075 |
| | | | | 382/154 |
| 2012/0084652 | A1 * | 4/2012 | Martinez Bauza | H04N 13/0007 |
| | | | | 715/719 |
| 2012/0105593 | A1 * | 5/2012 | Berestov | G02B 27/1066 |
| | | | | 348/49 |
| 2012/0113236 | A1 * | 5/2012 | Joynes | H04N 13/0402 |
| | | | | 348/51 |
| 2012/0194657 | A1 * | 8/2012 | Ko | G02B 27/2264 |
| | | | | 348/56 |
| 2012/0242810 | A1 * | 9/2012 | Florencio | H04N 13/0014 |
| | | | | 348/51 |
| 2012/0274745 | A1 * | 11/2012 | Russell | H04N 13/025 |
| | | | | 348/46 |
| 2013/0050432 | A1 * | 2/2013 | Perez | H04N 13/0278 |
| | | | | 348/47 |
| 2013/0057659 | A1 * | 3/2013 | Sakamoto | G02B 27/26 |
| | | | | 348/51 |
| 2013/0057662 | A1 * | 3/2013 | Ogaki | H04N 13/0497 |
| | | | | 348/51 |
| 2013/0069937 | A1 * | 3/2013 | Kim | G06F 3/0488 |
| | | | | 345/419 |
| 2013/0120535 | A1 * | 5/2013 | Cha | H04N 13/0014 |
| | | | | 348/46 |
| 2013/0187912 | A1 * | 7/2013 | Mueller | G06T 19/00 |
| | | | | 345/420 |
| 2013/0267317 | A1 * | 10/2013 | Aoki | A63F 13/00 |
| | | | | 463/32 |
| 2013/0300637 | A1 * | 11/2013 | Smits | G03B 35/18 |
| | | | | 345/8 |
| 2014/0002457 | A1 | 1/2014 | Swindell et al. | |
| 2014/0009508 | A1 * | 1/2014 | Woodgate | H04N 13/0418 |
| | | | | 345/690 |

OTHER PUBLICATIONS

International Search Report and Written Opinion received for PCT/US2014/057836, mailed on Dec. 29, 2014, 12 pages.

* cited by examiner

- Side view -

APPROACHES FOR SIMULATING THREE-DIMENSIONAL VIEWS

BACKGROUND

As the capabilities of various computing devices increase, and as people are utilizing computing devices for an increasing variety of tasks, the expectations of users of these devices continues to increase accordingly. As an example, an increasing number of applications are attempting to meet these expectations by providing a virtual reality, enhanced reality, or three-dimensional experience. While some devices utilize three-dimensional displays that require specific hardware, such as special viewing glasses, these can be expensive and complex, and can provide varying levels of user satisfaction. A large number of devices still utilize conventional two-dimensional displays or provide content that is substantially created in two dimensions. While certain shading or rendering can be utilized to give the impression of three-dimensional content, the content will typically not act like a true three-dimensional object or scene, as changes in position, orientation, or lighting will generally not be updated realistically in the display. Thus, the virtual nature of the displayed content can be significantly degraded.

BRIEF DESCRIPTION OF THE DRAWINGS

Various embodiments in accordance with the present disclosure will be described with reference to the drawings, in which.

DETAILED DESCRIPTION

Figure 1:
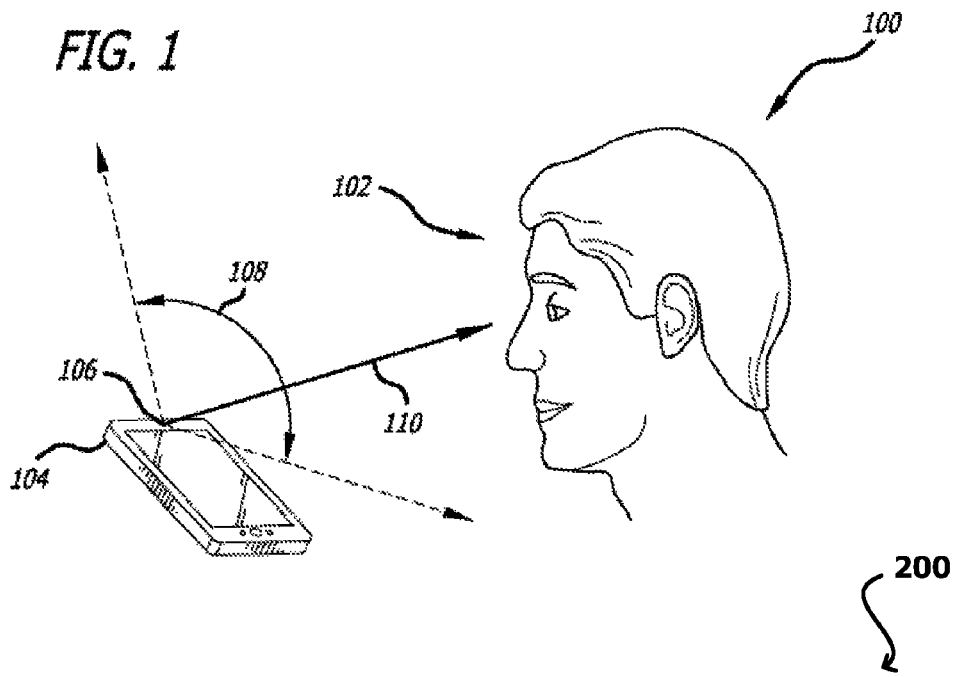
FIG. 1 illustrates an example situation where a user can view content and interact with a computing device in accordance with various embodiments.

Systems and methods in accordance with various embodiments of the present disclosure may overcome one or more of the aforementioned and other deficiencies experienced in conventional approaches to displaying content using an electronic device. In particular, various embodiments enable image content (e.g., still or video content) to be displayed to provide a viewer with an appearance or view of the content that is based at least in part upon a current relative position and/or orientation of the viewer with respect to the device, as well as changes in that relative position and/or orientation. The content can include various portions, and different adjustments can be applied to each portion based upon these and/or other such changes. These adjustments can include, for example, changes due to parallax or occlusion, which when added to the rendered content in response to relative movement between a viewer and a device can enhance the experience of the viewer and increase realism for content rendered on a two- or three-dimensional display screen.

For example, in accordance with various embodiments, portions of image content (e.g., planes or layers of content) can appear to be positioned and/or displayed in 3D space such that that some of the planes of content appear closer to a surface of the display screen of the device (and hence the viewer), while other planes of content "fall back" or appear smaller in 3D space, appearing to be further from the surface of the display screen. As the viewer tilts, rotates, or otherwise changes the orientation of the device, or as the viewer's relative position or orientation changes with respect to the device, the planes of content can appear to translate laterally, move back and forth in apparent distance from the surface of the screen, or otherwise change shape or appearance. The relative movements can be based upon factors such as the distance of the viewer to the device, a direction of movement of the user, a direction of change in orientation of the device, or other such factors. The relative movements can be selected such that the different layers of content appear to be positioned in three dimensions with respect to each other, and act appropriately with changes in relative position and/or orientation, and thus viewing angle, of the viewer.

In various embodiments, the relative position and/or orientation of a viewer of a computing device can be determined using at least one image capture element of the device. For example, the feed from a video camera can be analyzed to locate a relative position of the viewer in the video feed, which can be analyzed to determine the relative direction of the viewer. In other embodiments, one or more digital still cameras can capture images periodically, in response to detected movement of the viewer and/or device, or at other appropriate times, which then can be analyzed to attempt to determine viewer position, as distance can often be determined in addition to direction when analyzing multiple sources of information from different locations. Distance can be determined, for example, using stereoscopic imaging or proximity sensing, among other such options. In some embodiments, infrared (IR) imaging can be used to detect specific features of the viewer, such as the viewer's eyes, for use in determining and/or tracking the location of the viewer. In still other embodiments, changes in the orientation and/or position of the device can be determined using at least one motion sensor of the device, in order to provide for a higher sampling frequency than might otherwise be possible using the image information captured by the camera, or otherwise attempt to improve the relative position determinations. In some situations, a sensor that is remote, separate, or otherwise in communication with the device can be used to detect a change in orientation and/or position of the device. The orientation information can be received at the device from the sensor, and the device can cause the appearance of the interface to be altered based at least in part on the received orientation and/or position information. Accordingly, a viewer can view and interact with the planes of content, and can maneuver through the planes of content using various approaches discussed herein.

Based at least in part upon the determined direction of the viewer, the device can determine a primary viewing angle with respect to the plane of the display screen, and thus the planes of content (e.g., a scene) to be rendered and displayed on the device. For at least certain types of content, the device can adjust the rendering to provide a two- or three-dimensional representation of that content that is appropriate for that viewing angle, giving the impression of a three-dimensional view or display even when the display is in two dimensions. In at least some embodiments, the types of content can correspond to content on different planes, levels, or other such groupings of content. These groupings may be specified through software, the user, etc. In some embodiments, the groupings may be provided via the operating system on the device, where different portions of an image or other content to be displayed are assigned to different layers, levels, etc. The operating system of the device can include an application library that includes one or more application files configured to render content at different depths and/or appearance, or any information configured to organize and/or render content at different depths and/or appearance.

In at least some embodiments, a computing device can attempt to determine changes in the relative position, direction, and/or orientation between the viewer and device in order to update the perspective from which the displayed content is rendered or otherwise displayed. For example, the device can continue capturing and analyzing image information to attempt to determine changes in relative position of the viewer, such as may be based on movement of the viewer and/or the device. The device also can utilize information from at least one orientation or position determining element of the device, such as an accelerometer or inertial sensor, to assist in detecting motions of the device and updating the viewing angle accordingly. These elements also can detect changes in orientation of the device, such as through rotation of the device, even though the relative position between the viewer and the device might not have substantially changed. The display can be updated based at least in part upon changes in orientation as well. By adjusting the perspective from which the image content is rendered to correspond to changes in the relative viewing angle of the user, a three-dimensional representation can be generated on a two- or three-dimensional display screen that is consistent, across multiple viewing angles, with actual or virtual three-dimensional content.

The ability to update a perspective of rendered content can provide additional advantages as well. For example, an object included in the planes of content might at least partially obscure or occlude another object. Using conventional displays, a viewer would not be able to view the occluded content. By enabling the rendering perspective to change based upon relative position or orientation, a viewer can effectively look "around" the occlusion to view the content that was previously not visible in the display. Further, the amount by which the occlusion moves upon a change in position or orientation can be indicative of a relative height or distance between the occlusion and the other content, which can be useful for mapping or other such applications.

Various embodiments utilize a node hierarchy of user interface elements that includes position information (e.g., a lateral position and depth position) of the planes of content. The position information can be used by the device to render a view of the content based on the relative position, direction, and/or orientation between the viewer and device to provide a two- or three-dimensional representation of that content that is appropriate for that viewing angle, giving the impression of a three-dimensional view or display even when the display is in two dimensions. As the relative position of the viewer and/or orientation of the device changes, the position information for corresponding planes of content is updated, and the updated position information is used to adjust the perspective from which the planes of content is rendered to correspond to changes in the relative viewing angle of the viewer. For example, as changes in the relative position, direction, and/or orientation between the viewer and device are determined, a set of transformation equations to adjust a scale and a translation for the content can be determined. The transformation equations can be used to adjust the perspective from which the planes of content are rendered to correspond to changes in the relative viewing angle of the viewer. In this way, the equations can be used to determine how to display or otherwise alter the appearance of the planes of content in 3D space (e.g., such as by bringing an element "forward" toward the front of the display screen or bringing an element "back" from the front of the display screen), laterally, etc. For example, in accordance with an embodiment, the transformation equations are used to apply a scale effect that mimics that which would accompany a perspective frustum by scaling about a fixed pivot point in the center of the display screen. As the position of the viewer to the device changes, the simulated frustum is skewed to the side by translating deeper planes of content laterally based on their depth. For example, a lateral motion of a user with respect to a computing device can have an associated change in angular direction with respect to a normal of a display screen of the device. Using basic geometry, the change in angle can result in different lateral translations of objects in different planes of content, based at least in part upon the virtual distance between those planes. Planes and objects included in those planes that are intended to appear closer to the user will then be translated by a greater amount than planes and objects in those planes that are intended to appear further from the user, in order to provide the impression of objects positioned in three-dimensional space.

Various other applications, processes, and uses are presented below with respect to the various embodiments.

FIG. 1 illustrates an example situation 100 wherein a user 102 is interacting with a computing device 104. Although a portable computing device (e.g., a smart phone, an electronic book reader, or tablet computer) is shown, it should be understood that various other types of electronic device that are capable of determining and processing input can be used in accordance with various embodiments discussed herein. These devices can include, for example, notebook computers, personal data assistants, video gaming consoles or controllers, portable media players, and wearable computers (e.g., smart watches, smart glasses, etc.) among others. In this example, the computing device 104 includes a camera 106 positioned on a side or corner of the device such that the imaging element will likely be able to capture image information of at least a portion of the user while the user is viewing content displayed on the device. For example, the imaging element 106 in FIG. 1 is on the front of the device such that an angular capture range 108 of the imaging element can image at least a portion of the user while the viewer is viewing content displayed on the display element of the electronic device. As will be discussed in detail later herein, being able to capture image information for the user enables the device to determine a relative position and/or orientation of the user with respect to the device and adjust a display of content on the device in accordance with that position and/or orientation.

For example, the display screen can present the appearance of 3D, or 3D-like behavior, but might be a standard 2D display. Accordingly, various embodiments enable planes of content (e.g., images, text, advertisements, etc.) to appear in 3D, such as by bringing a plane "forward" or otherwise causing the plane to appear to be positioned towards the front of the display screen in a 3D display or quasi-three-dimensional rendering on a 2D display element of "backwards" or at a greater distance from the front of the display screen. Further, the rendering can utilize 3D mapping information, such as a set of layer depths or z-levels, to determine how to relate various interface elements to each other.

Figure 2:
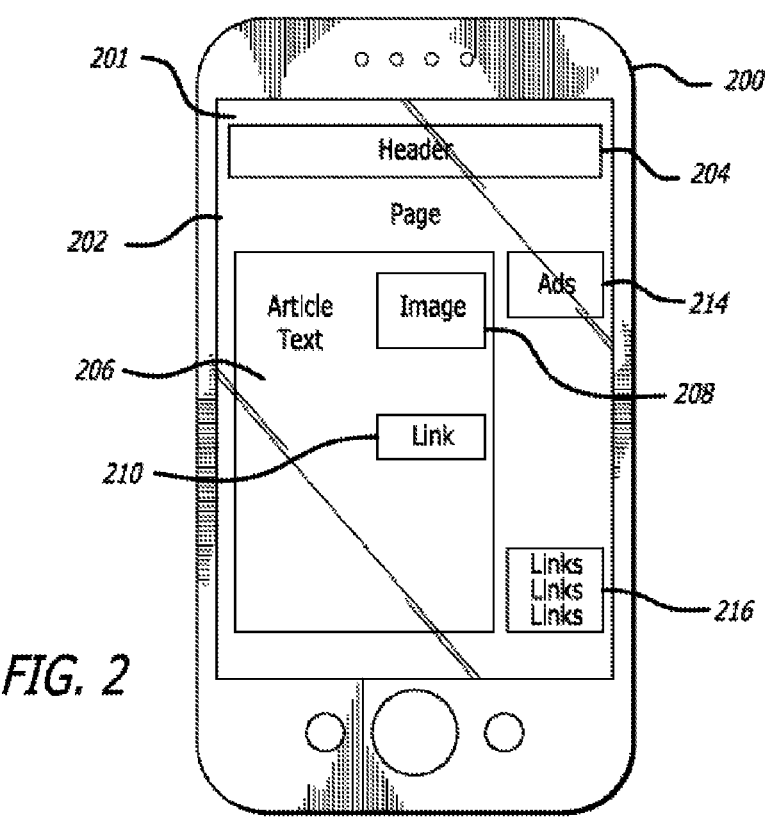
FIG. 2 illustrates an example state of an interface that can be rendered in accordance with an embodiment.

FIG. 2 illustrates an example 200 of an interface displayed on a display screen 202 of a computing device 200. In this example, a user is viewing a conventional 2D representation of a webpage 201. As with many conventional webpages, the areas of the webpage can be divided into zones or areas depending on the content type, the markup of the webpage, visual classification of the webpage, and/or white space analysis of the webpage. In this example, portions of image content (e.g., planes or layers of content, or other interface elements) can include a header 204, article text 206, at least one image 208, at least one link 210, advertisements 214, and various other links 216. It should be understood, however, that aspects of the various embodiments can be used with a variety of types of interface, which can include a wide variety of different portions of image content.

In a conventional 2D representation, the portions of image content, such as the interface elements described, can be organized in a number of different ways. One such way is to organize the interface elements in a user interface hierarchy, such as one that includes parent and child nodes that correspond to user interface elements. An example of a user interface hierarchy can include, for example, a root node of the hierarchy, where there may be a layout container or view group that sets forth how its children are to be arranged for display. Examples of layouts can include frame layouts, linear layouts, relative positioning layouts, grid-based layouts, among others. Layout containers can include one or more child layout containers. Child layout containers can include one or more of their own child layout containers and one or more of their own view. In some embodiments, a layout can be defined declaratively in a language such as extensible markup language (XML) and/or programmatically in a language such as Java®. An advantage of such an approach can enable the "look" of an application to be designed without particularized knowledge of software programming. The user interface hierarchy can include layout information that can be used to determine the relative position or layout of one interface element to another interface element. Accordingly, using the hierarchy of interface elements, developers can quickly and efficiently modify the appearance and/or actions of the interface elements to create an interactive interface. However, because the layout information corresponds to the relative position of one interface element to another interface element (e.g., the x/y coordinates of one interface element to another interface element), and does not include depth information or screen-space position information, it becomes difficult to render a layout or view as a 3D scene with parallax, shadows, and 3D perspective without the absolute position of the interface elements relative to the display screen. In should be noted that in various embodiments, the relative position data can include the relative position of one interface to another interface element. Accordingly, since an interface element corresponds to a node in the hierarchy of nodes, the relative position data can correspond to the relative position (x/y coordinates) of one node in the hierarchy to another node in the hierarchy.

Accordingly, in accordance with various embodiments, each node can include screen-space position data instead of, or addition to, relative position data. In accordance with various embodiments, the screen-space position data can corresponds to a display position (e.g., a lateral and/or depth position) on a display screen of a computing device. Thus, each node can include the screen-space position data corresponding to a display position of the display screen for an associated interface element, where the screen-space position data can include position information for a nodes position relative to the display screen. In accordance with various embodiments, this can include a lateral position (x/y coordinates) and a depth position (z coordinate) of the interface element relative to the display screen.

The screen-space coordinates for a respective node can be updated based on changes in that nodes position due to animations or scrolling, and/or changes in orientation of the device or user of the user relative to the device. The tracking can occur automatically. Accordingly, the positioning data provided by this system can enable several important effects. For example, the relative positions of two views at different depths that do not share a direct parent-child relationship allow shadows to be cast correctly between them. It also gives the necessary information to compute perspective effects, as it is necessary to know where each view is with respect to the shape of the view frustum. Additionally, if true 3D content is embedded into the views, this data allows it to be oriented correctly based on its location in space.

Figure 3:
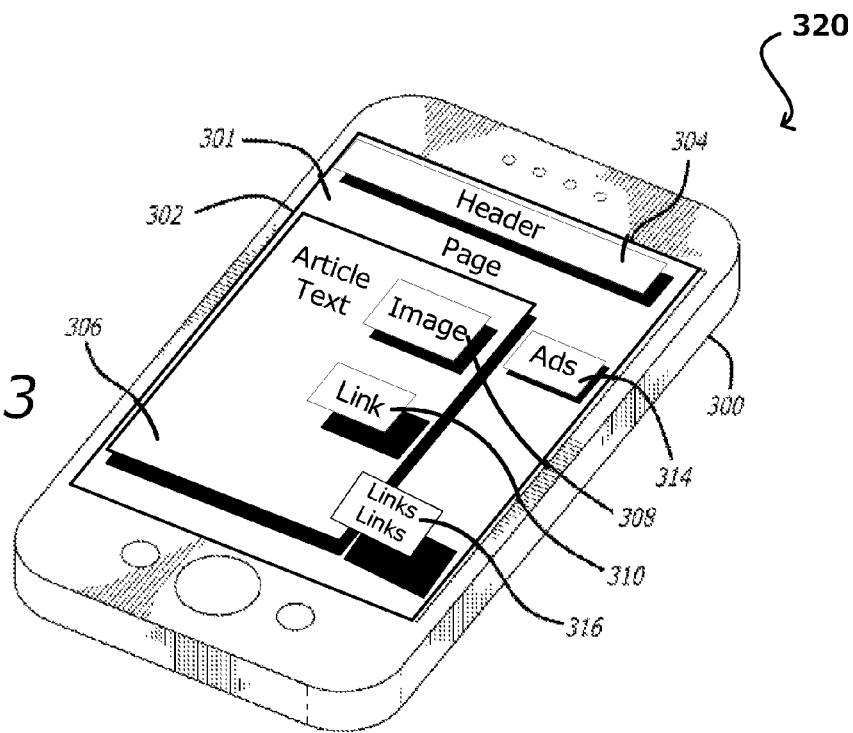
FIG. 3 illustrate an example state of an interface that can be rendered in accordance with various embodiments.

For example, FIG. 3 shows an example 320 of an the interface 301 displayed on a display screen 302 of a computing device 300. As shown, the interface includes a number of interface planes or elements, which include a header 304, article text 306, at least one image 308, at least one link 310, advertisements 314, and various other links 316 displayed at different depths (or z-levels) on the display screen 302 of computing device 300. In this example, a section of other links 316 is displayed at the highest level while advertisements 314 are displayed at the lowest level. Accordingly, each interface plane or element can be rendered to correspond to a particular depth, such as may be determined from a parent interface plane or element. In some situations, an interface plane can be inside an interface plane. For example, image 308 and link 310 are inside article text 306. In this situation, the article text 306 is a parent interface plane to image 308 and link 310. As such, image 308 and link 310 can inherent the depth of parent article text 306 and can be offset by some relative amount from article text 306.

Developers can specify 3D attributes (e.g., the appearance, depth, animations, etc.) of the interface elements to specify how the interface elements appear based on the relative position, direction, and/or orientation between the viewer and device to provide a two- or three-dimensional representation of that content that is appropriate for that viewing angle, giving the impression of a three-dimensional view or display even when the display is in two dimensions. Such information can be specified in each node of the view hierarchy. In this way, the device can utilize the view hierarchy to display a view of the interface having the correct perspective. As the relative position of the viewer and/or orientation of the device changes, the position information for corresponding planes of content can be updated, and the updated position information can used to adjust the perspective from which the planes of content is rendered to correspond to changes in the relative viewing angle of the viewer. For example, as changes in the relative position, direction, and/or orientation between the viewer and device are determined, a set of transformation equations to adjust a scale and a translation for the content is determined. The transformation equations can be used to adjust the perspective from which the planes of content are rendered to correspond to changes in the relative viewing angle of the viewer. In this way, the equations can be used to determine how to display or otherwise alter the appearance of the planes of content in 3D space (e.g., such as by bringing an element "forward" toward the front of the display screen or bringing an element "back" from the front of the display screen), laterally, etc. For example, in accordance with an embodiment, the transformation equations are used to apply a scale effect that mimics that which would accompany a perspective frustum by scaling about a fixed pivot point in the center of the display screen. As the viewing angle changes, the simulated frustum is skewed to the side by translating deeper interface elements laterally based on their depth.

Figure 4:
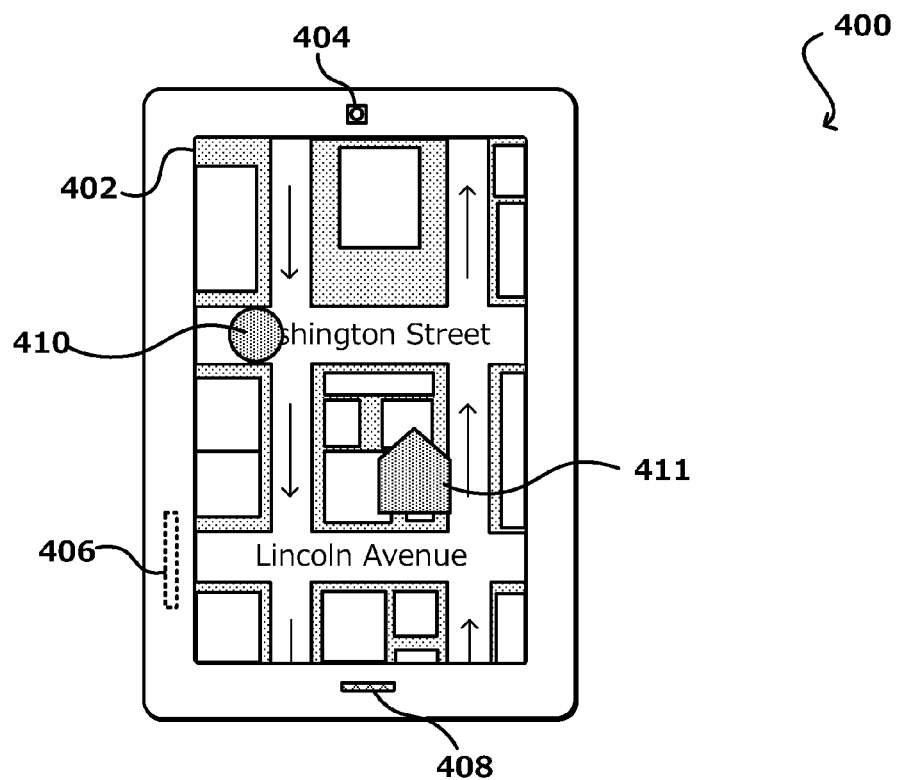
FIG. 4 illustrates an example state of map information that can be generated in accordance with various embodiments.

FIG. 4 illustrates an example device 400 displaying map content on a display element 402 of the device. In this example, the user has entered an address into a mapping application, and mapping information is generated for display on the display element 402, including a pin or marker 410 indicating the approximate location of the address on the map region and pin or marker 411 indicating the user's home. In this example, the pin or markers 410 and 411 are rendered at a depth above the map. However, when the user (not shown) is in a default position (or within a default range of positions) with respect to the device, such as substantially in front of the display screen, the pins or markers appear relatively flat. It should be noted that approaches to locating an address or location and generating map information are well known in the art and, as such, will not be discussed herein in detail.

As discussed, it can be desirable in at least certain embodiments to enhance the realism of such a situation as much as possible. One way is to add shading to the image such that the pin and buildings displayed appear to be three-dimensional objects. Generally, the shadows are rendered from a fixed direction and applied to a particular view, such as a top-down view as illustrated. If the user moves the device, or moves relative to the device, however, the shading will not change and the perspective of the device will not adjust to show buildings or the pin from appropriate views resulting from the rotation, which can take the viewer out of the experience. Similarly, the appearance of the items will not adjust if the user moves relative to the device, such that the user will be aware that the display is a two-dimensional rendering.

Systems and methods in accordance with various embodiments can take advantage of any of a number of elements that can be used to determine changes in relative position and/or orientation between a user and an electronic device. For example, the device 400 in FIG. 4 includes an imaging element 404 which can be used to capture image information for determining a relative position or direction of a user as mentioned above. An orientation-determining element 406, such as an accelerometer, electronic gyroscope, or inertial sensor, can determine changes in the position or orientation of the device. Other input elements 408, such as microphones or proximity sensors, can be used as well in other embodiments. The information from at least some of these elements can be analyzed to determine a current viewing angle from the perspective of the user. By determining the current viewing angle, for example, the device can render content that corresponds substantially to a three-dimensional view of the content from the perspective of the user.

Figure 5A:
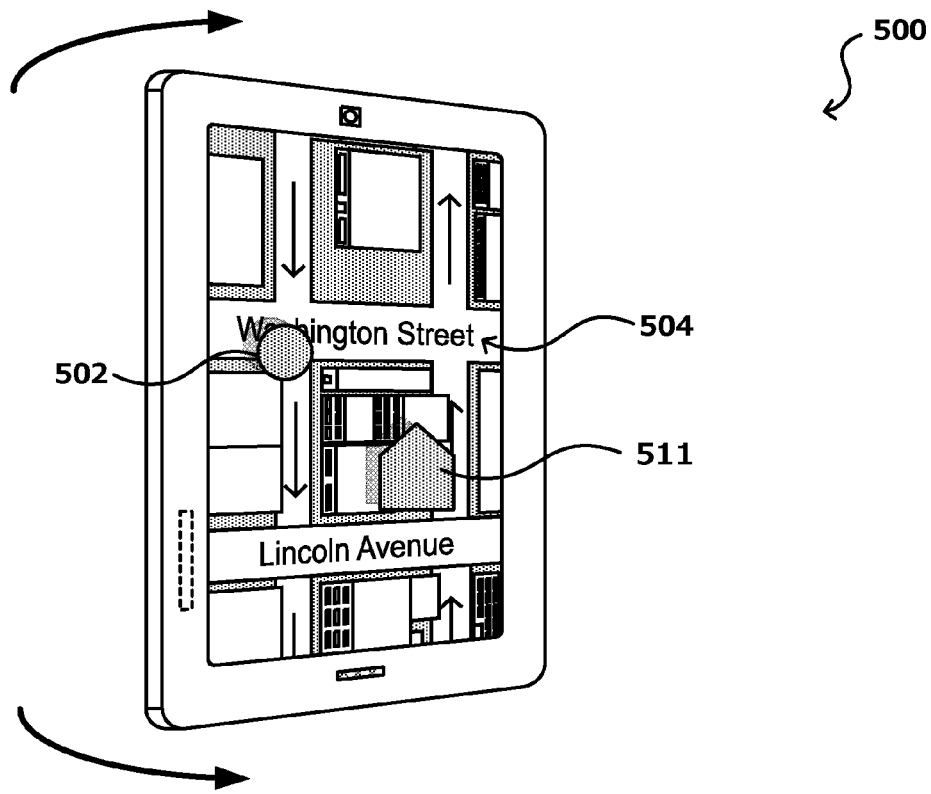
FIGS. 5(a) and 5(b) illustrate various states of the map information that can be rendered in accordance with various alternate embodiments.

For example, FIG. 5(a) illustrates an example orientation of the device 500 upon the device being rotated along a primary axis of the device, although a similar change in relative orientation could result from motion of the user as will be discussed in more detail later herein. As can be seen, the rotation of the device triggered a corresponding change in the map information 504 displayed on the device. For example, instead of seeing a top view of each building, the sides of various buildings are displayed corresponding to the current viewing angle of the user. Thus, even though the display is a two-dimensional display, the rendered view of a building can be such that the display will present a view of that building that is similar to what the user would see if viewing a three-dimensional version of a building from the current viewing angle. In this example, where the left edge of the device is rotated out of the plane of the Figure, the left side of various buildings is rendered (along with a portion of the roof or other perspective-appropriate portions) based on the viewer direction being substantially orthogonal to the plane of the Figure.

In FIG. 5(a), the rendering of the location pins 502 and 511 have also updated accordingly. In FIG. 4, the pins were shown in a substantially top-down view. In FIG. 5(a), the location pins 502 and 511 are rendered to appear to be above the map content and rendered for the current viewing angle of the user. As described, portions of image content, such as the location pins 502 and 511, can be organized in a hierarchy, such as one that includes parent and child nodes. The location pins can be associated with a node, where the nodes can be part of a node hierarchy. The relationship between nodes (e.g., parent-child relationship in a node hierarchy) can include position information and the position information can be used to determine the relative position of one interface element to another interface element. The position information can also include screen-space position data that can include position information for a pins screen-space position, such as a lateral position (x/y coordinates) and a depth position (z coordinate) of the interface element relative to the display screen. In this example, the map content can be at first level (i.e., be associated with a first depth) and the pins can be at second level, where the second level is "taller" than the first level and content associated with the second level appears closer to the display screen. In addition to changing the way the pin is displayed, the user can now view information that might have previously been hidden or occluded by the pin in the top view. For example, in FIG. 4 the W in "Washington Street" was occluded by the location of the pin. In FIG. 5(a), the rotation of the device has resulted in the rendering of the pin changing to reflect the current viewing angle, which also results in the W in Washington Street now being viewable by the user. Thus, the rendering changes not only the perspective of various elements but can also move those elements appropriately relative to any other elements or occluded portions in order to further provide the sense of a three-dimensional world. A user thus can adjust the relative orientation between the user and the device to view information occluded by an object, which may not have been possible in conventional approaches without manually moving or removing the pin.

Since the user would not have been able to see the full name of Washington Street in either of the previous orientations, the user can continue to adjust the relative orientation of the device until the desired information is viewable. For example, in FIG. 5(b) the user can tilt the top of the screen forward out of the plane of the Figure, causing a different rendering of objects in the image. In this example, a side of the buildings towards the top of the device can be seen, and a "height" of the pin 502 is adjusted based upon the new orientation. In this example, the name of the street that was previously occluded now can be seen in the displayed image information, as "Washington Street" is now visible in the image.

Figure 5B:
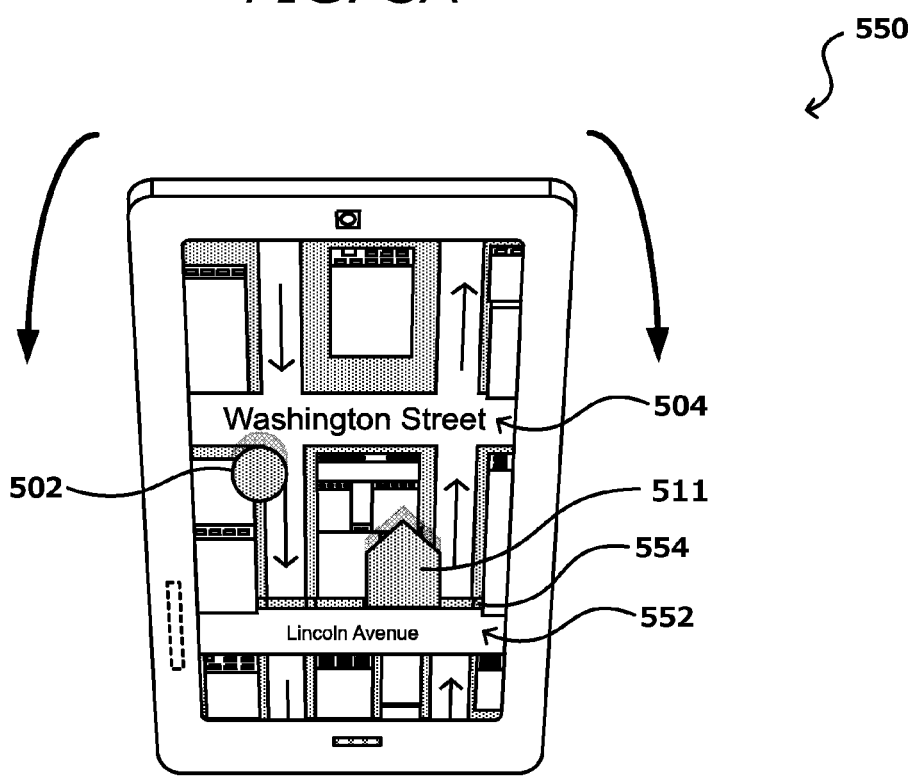

Another advantage of changing the orientation is that the user can also view different angles of occlusions that might not otherwise have been obvious to the user. For example, in FIGS. 4 and 5 there is not much distinction in the display of Washington Street and Lincoln Avenue, other than their respective locations. In the rendering of FIG. 5(b), however, the orientation illustrates that Lincoln Avenue is in fact a raised street 552, as the position of the street shifts upon orientation change due to the street being at a different distance or plane. Further, shadowing 554 or other elements (e.g., posts or arches) can be added to further illustrate the difference in location and perspective. Using conventional top-down views, the user might not have been able to discern that Lincoln Street was actually above the other nearby streets, and could not be turned directly onto from either of the one way streets that cross under Lincoln Avenue.

An approach in accordance with various embodiments can instead utilize layers of graphical elements that can move at different rates with respect to each other, providing a sense of depth and three-dimensional movement. This can include rendering a view to have at least two (and in many situations more) different "levels" or z-depths, where the upper level of some interface elements is rendered to appear near the outer surface of the display screen and the upper level of other interface elements can be rendered to appear at a lower level to the interface (e.g., separated a distance from the outer surface of the display screen).

Figure 6A:
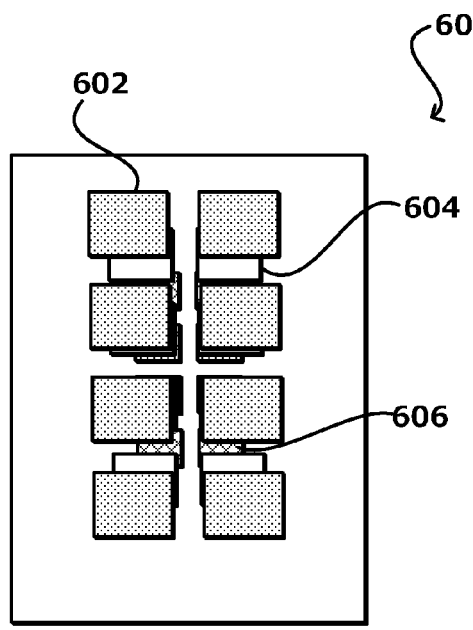
FIGS. 6(a), 6(b), and 6(c) illustrate various states of levels of graphical icons that can move by level in accordance with various embodiments.

For example, FIG. 6(a) illustrates a display 600 including three layers of graphical elements 602, 604, 606, such as graphical icons representing applications, folders, shortcuts, or any other type of object known or used on electronic devices to access various types of functionality or information. In this example, a first layer of elements 602 is rendered "over" a second layer of elements 604, which is rendered over a third layer of elements 606. It should be understood that there can be any number of levels including any appropriate number of elements, and that the ordering of the various layers can be adjusted or selected using any of a number of potential approaches, such as sorting or navigating the various layers. In this example, the elements of each layer are rendered with a different relative size, providing to the user a sense of distance of the various elements. In various embodiments, the device can use information such as the field of view of the camera, as well as the position of the user's head or eyes to determine a current point of view of a user, and the point of view can be used to render an interface on a display screen or other such element of the computing device. The rendering can update as the determined point of view changes as a result of movement of the user and/or the computing device. The rendering can utilize 3D mapping information, such as a set of layer depths or z-levels, to determine how to relate various interface elements to each other.

Figure 6B:
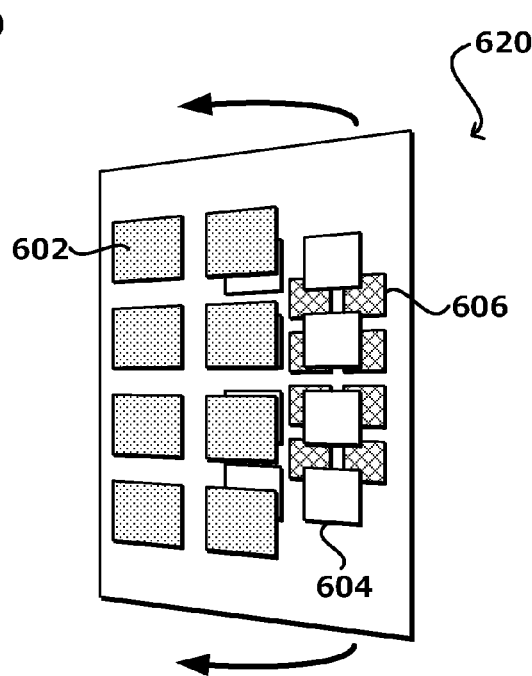

In order to enhance that sense of distance, as well as to provide a sense of space and enable the user to obtain different views of the various elements, the layers can also move laterally with respect to each other at different rates, where the rate of movement is coupled with the relative size for that layer. For example, in FIG. 6(b) there has been relative movement between the user and the device on which the image information is displayed. As can be seen, the first layer of elements 602 that is "closest" to the user has moved by the greatest amount. The second layer of elements 604 has moved by a smaller amount, representative of their respective distances, with the third layer of elements 606 moving the least, if at all. In fact, in embodiments where it is desired to keep the information substantially centered on the display, the third layer of elements might actually move in the opposite direction, as illustrated in FIG. 6(b), although the net relative movement between could remain the same in either approach. As can be seen, in addition to providing a sense of three-dimensional space, the ability to rotate the view enables different elements to be seen, which can help the user to locate and/or navigate to an element of interest, which might otherwise be hidden or occluded by an overlying element. For map views, for example, each block of buildings might be assigned to a different layer, enabling the user to make distance determinations and more accurately determine location information from the quasi-three-dimensional view.

In various embodiments, the device can adjust the appearance of shadows associated with the relevant interface elements to make those elements appear to be higher in the interface, as well as to give a 3D appearance as each shadow can move in position relative to an associated element as the point of view changes, for example, to give the impression of an actual shadow being case by the relevant element. Further, the interface can render sidewalls or other elements that appear to provide a depth of the interface element from the point of view of the user, and the extent and shape of these elements can adjust with changes in point of view, as well as an orientation of the device. Various other behaviors can be used as well to mimic 3D behavior as well as an appearance of stacked interface elements. In at least some interfaces, there might be more than three levels, and the amount of shadowing, color adjusting, and other such aspects can depend at least in part upon the level with which the element is associated.

Figure 6C:
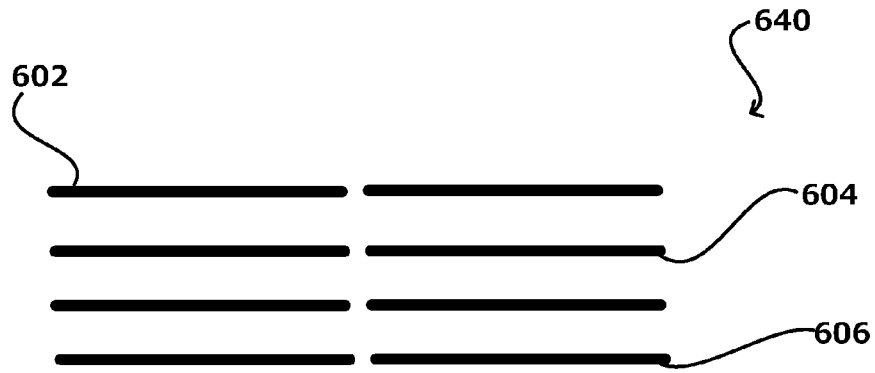

In some embodiments, the graphical elements, as shown in display 620 of FIG. 6(b), can be three-dimensional blocks that can be rotated individually as well, in order to show a least a side portion as discussed elsewhere herein. In this example, however, the elements are essentially "flat" or otherwise unable to rotate individually, with the three-dimensional feel being generated primarily by the differences in lateral translation. While the inability of the individual elements to rotate can potentially lessen the three-dimensional experience for some users with respect to rotatable elements, the amount of processing capacity can be significantly less and the rendering time less for at least some devices, which can enhance the overall user experience. As further shown in display 640 of FIG. 6(*c*), as the relative position, direction, and/or orientation between the viewer and device is changed, the rendering of the displayed content is updated. For example, in FIG. 6(*c*), the view has been updated due to a change in the orientation of the device to show a side view of the elements 602, 604, and 606.

Figures 7A, 7B:
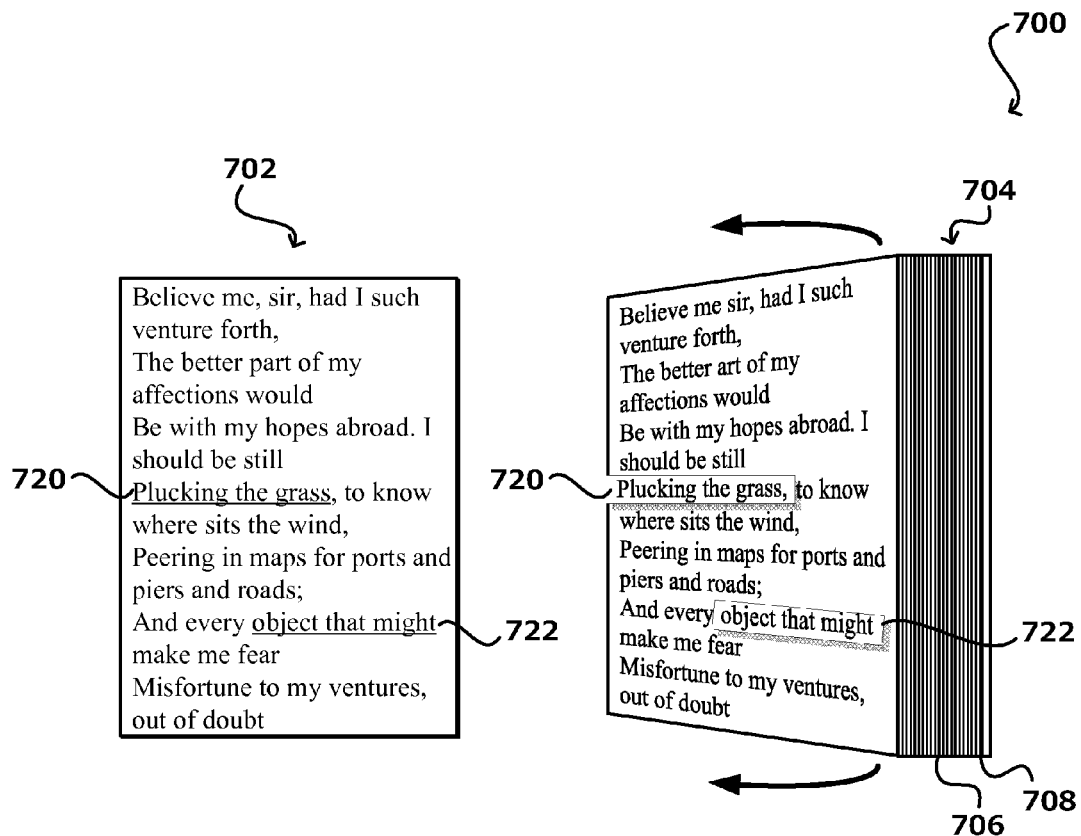
FIGS. 7(a) and 7(b) illustrate various states of book content in accordance with various embodiments.

FIGS. 7(*a*) and 7(*b*) illustrate different views of an electronic book (e-book) 700, or similar content, that can be displayed on an electronic device using various approaches discussed herein. In FIG. 7(*a*), the user (not shown) is in a default position (or within a default range of positions) with respect to the device, such as substantially in front of the display screen. Accordingly, the user can obtain a conventional view of the text 702 in the e-book at that viewing angle. In this view, the linked text 720 and 722 (i.e., text linking to other content) appears flat and otherwise part of the other text. While reading the e-book, the user might want to obtain certain information, such as how far the user is from the end of the book, how far it is until the next chapter, or expose or otherwise emphasize text that links to other content and/or is highlighted (e.g., underlined or bolded). Accordingly, a user can change a viewing angle of the user with respect to the device, such as by rotating the device or moving the user's head, to view a "side" of the electronic book on the display. As illustrated in FIG. 7(*b*), the user can tilt the device to see a view that includes a representation of the edges 704 of the pages of the book between the current page and the end of the book. Additionally, titling the device causes the links to appear to be above the text on the page, and as such, the user can quickly identify the links. Such an approach can provide value to the user, and also potentially make the e-book experience more like reading an actual book. Additional information can be added as well. For example, the edge of the book can include not only an indicator 708 of the end (i.e., back cover) of the book, but can also include other indicators 706 to certain sections as well. For example, the side of the e-book can include indicators marking the location of the next chapter and/or subsequent chapters, as well as the location of various notes, bookmarks, highlights, etc. Using such an approach, a user can tilt the device to see how far until the end of the chapter, for example, to determine whether to continue reading until the end of the chapter or end the current viewing session at a different location. In some embodiments, the rendered image can also be manipulated (e.g., stretched or otherwise deformed) in order to make the view of an object from the perspective of the user seem as if the display screen is a piece of glass through which the user is looking, rather than a conventional display screen in which things become increasingly compressed as the viewing angle increases.

Figure 8:
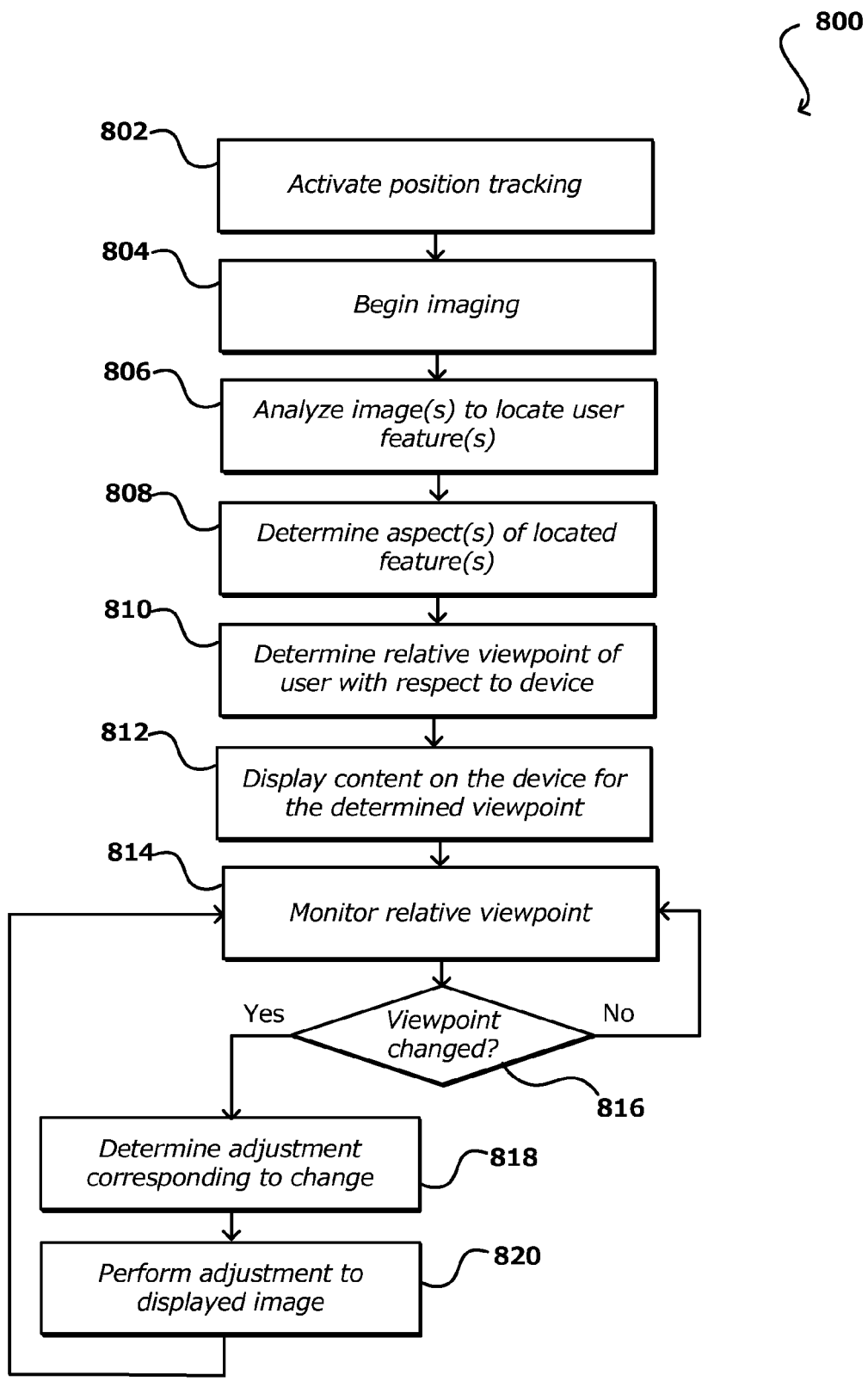
FIG. 8 illustrates an example process for updating a display of information to account for orientation changes in accordance with various embodiments.

FIG. 8 illustrates an example of a of a process 800 for providing a relative orientation-based image display that can be used in accordance with various embodiments. It should be understood that, for any process discussed herein, there can be additional, fewer, or alternative steps performed in similar or alternative orders, or in parallel, within the scope of the various embodiments unless otherwise stated. In this example, position tracking of a viewer is activated 802 on the device. In some embodiments a user may activate this mode manually, while in other modes the device can activate the mode automatically when a person is detected nearby. Other modes of activation are possible as well, such as upon a user opening a specific application on the device. When the position tracking is active, a camera (e.g., camera 106 of FIG. 1) of the device can capture 804 still images or video of a user of the device. As discussed elsewhere herein, in some embodiments, the imaging will involve ambient light image or video capture, while in other embodiments a device can utilize infrared imaging, heat signature detection, or any other such approach. The device can analyze 806 the captured images to attempt to locate features of a user, or at least a person nearby, where those features in some embodiments include at least the eyes, nose, or head of a user. In some embodiments, the device will attempt to locate an object that is shaped like a human head and that contains two eye-like features. In other embodiments, facial recognition or any other such algorithm can be used to attempt to determine the presence of a human head, or other portion or feature of a user, in the field of view of at least one of the imaging elements.

Once the user features are located, the device can attempt to determine 808 aspects or information relating to those features such as the approximate location and size of the user's head or face. In this example, the determined aspects can be used to attempt to determine 810 a relative orientation between the device and the user, as well as the orientation of those features relative to the device in at least some embodiments, which can be useful in determining information such as a viewing location of a user. For example the viewing locating of the user can be determined using the information (e.g., the positions of the user's eyes, pupils, head, or other such features), which can be indicative of at least a general point of view. Software executing on the computing device (or otherwise in communication with the computing device) can obtain information such as the angular field of view of the camera, the zoom level at which the information is currently being captured, and any other such relevant information, which can enable the software to determine an approximate direction of at least one of the user's eyes with respect to the camera. In many embodiments, direction information will be sufficient to provide adequate point-of-view dependent rendering. Image content (e.g., images, text, planes of content, etc.) can be displayed 812 based on the determined viewing location of the user. As described, image content can be displayed to a viewer with an appearance or view of the content that is based at least in part upon a current relative position and/or orientation of the viewer with respect to the device, as well as changes in that relative position and/or orientation. The content can include various portions, and different adjustments can be applied to each portion based upon these and/or other such changes. For example, in accordance with various embodiments, portions of image content (e.g., planes or layers of content) can appear to be positioned and/or displayed in 3D space such that that some of the planes of content appear closer to a surface of the display screen of the device (and hence the viewer), while other planes of content "fall back" or appear smaller in 3D space, appearing to be further from the surface of the display screen. The determined aspects of the user then can be monitored 814 over time, such as by continuing to capture and analyze image information to determine the relative position of the user and/or orientation of the device. In at least some embodiments, an orientation-determining element such as an accelerometer or electronic gyroscope can be used to assist in tracking the relative location of the user and/or current relative orientation of the device. A change in the aspect, such as a change in position or orientation, can be determined 816, and the device can determine 818 whether that change requires an adjustment to the image to be displayed. For example, an application might require the device to be rotated a minimum amount before adjusting the displayed image content, such as to account for a normal amount of user jitter or other such movement that may not be intended as input. Similarly, certain embodiments might not utilize continuous rotation, but might change views upon certain degrees of change in relative orientation of the device and/or a position of the user relative to the device. If the orientation change is sufficient to warrant an adjustment, the device can determine and perform 820 the appropriate adjustment to the content, such as to adjust the screen-space position of interface elements.

For example, as described, the image can include portions of image content (e.g., planes or layers of content). Each plane of content can be an interface element, such as a shape, text, object, etc. As described, the interface elements can be organized in a hierarchy of nodes that can include at least one parent node and one or more child nodes. The relationship between the nodes (e.g., parent-child relationship in a node hierarchy) can include position information and the position information can be used to determine the relative position of one interface element to another interface element. Accordingly, using the hierarchy, such as any view hierarchy of interface elements, developers can quickly and efficiently adjust the appearance and/or actions of the interface elements to create an interactive interface. Further, each node can include screen-space position data. As described, screen-space position data can include the position of an interface element relative to the display screen, where the position can include a lateral position (x/y coordinates) and a depth position (z coordinate) of the interface element relative to the display screen. The screen-space coordinates for the nodes can be updated based on changes in a nodes position due to animations or scrolling, and/or changes in orientation of the device or user of the user relative to the device, and the updated position information can be used to adjust a view of the image information.

Figure 9:
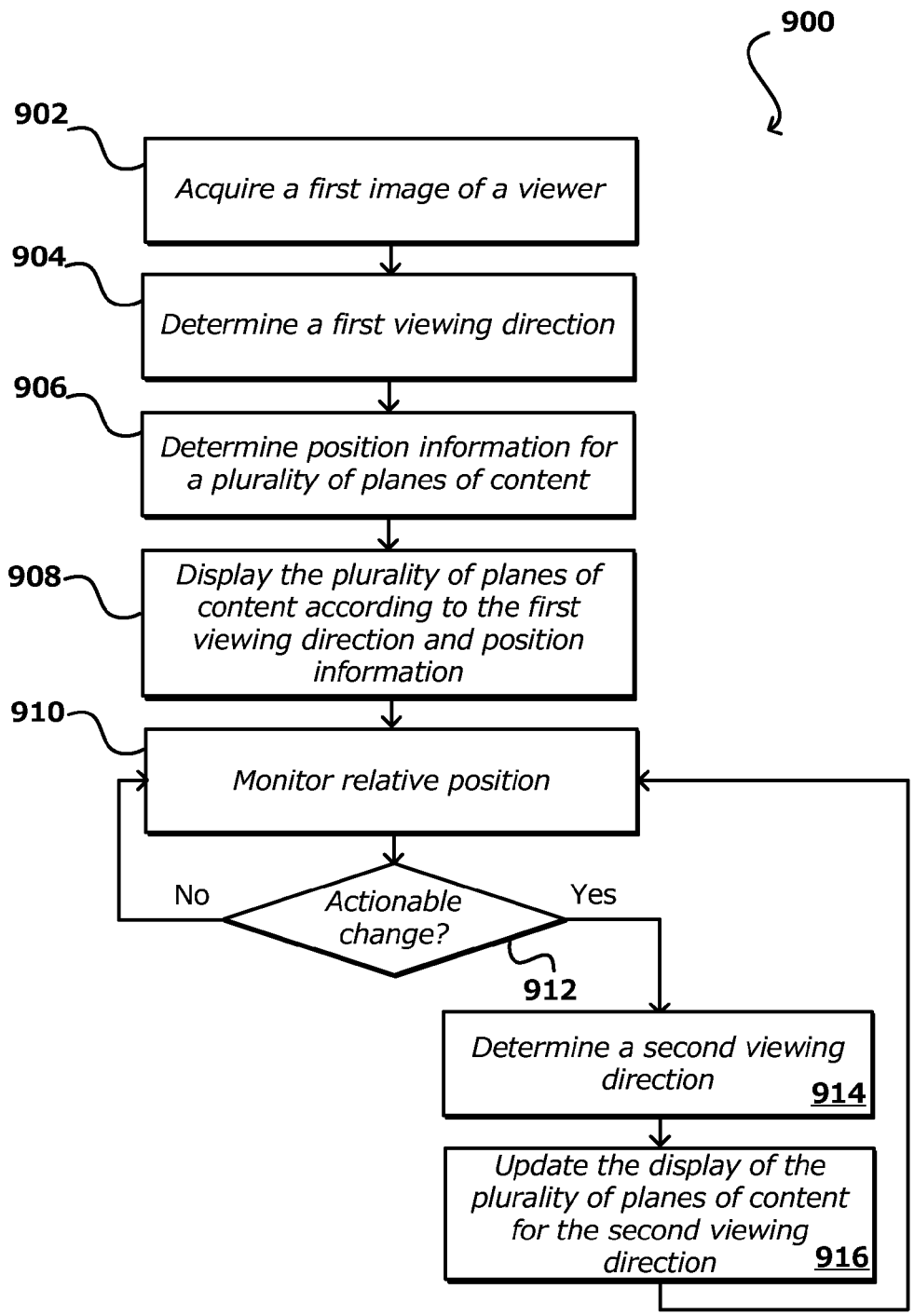
FIG. 9 illustrates an example process for determining a relative position of a viewer that can be used in accordance with various embodiments.

As an example of one such adjustment, FIG. 9 illustrates a process 900 for modifying the image in response to a determined change in orientation that can be used in accordance with various embodiments. During operation, an electronic device can acquire 902, using a camera of the device, at least one first image of a viewer of the device. The device can determine 904 (and monitor over time), by analyzing the first image, a first viewing direction or viewing angle of the viewer with respect to the device (such approaches described in FIGS. 12-14). Position information for a plurality of planes of content can be determined 906, where the position information for each plane of the plurality of planes of content can include a first lateral position and a first depth position relative to the display screen. As described, planes or layers of content, or other interface elements can include a header, article text, an image, a link, advertisements, etc. It should be understood, however, that aspects of the various embodiments can be used with a variety of types of interface, which can include a wide variety of different portions of image content.

An application executing on the device (or remote to the device) can utilize mapping, the position information, or other such data to render image content from a perspective associated with the first viewing direction. For example, the device can display 908, on the display screen, the plurality of planes of content, where each plane of the plurality of planes of content is displayed according to the respective first lateral position and the respective first depth position, and the subset of the plurality of planes of content further being displayed according to the respective first lateral offset.

Once the viewing direction of the user is determined, the device can attempt to monitor 910 or detect changes in the viewing direction or relative position, as may result from changes in position or orientation of the user and/or the device. Changes in the relative position can be analyzed to determine whether the change is actionable 912 to cause the device to update the displayed interface, such as where the change meets a minimum movement threshold. In some embodiments, small movements might not result in adjustments in the display, in order to account for jitter or subtle variations due to the user holding a device, for example, that are not intended as input to change the perspective. In various embodiments, there also may be a minimum amount of movement desired in order to justify the re-rendering of the displayed image content. For example, cellular phones and portable media players might not have a significant amount of graphics processing capacity, such that continually attempting to re-render content using three-dimensional maps or other such information can consume a significant amount of resources of the device, slowing down the rendering and potentially other functionality. Further, continually performing complex renderings can significantly drain battery power for at least certain devices. Thus, for at least some devices it can be desirable to at least wait to re-render the image from a different perspective until there is a minimum amount of movement, etc.

If there is no actionable movement, the device can continue to monitor the relative position of the user. If there is actionable movement detected, the device can attempt to determine the new relative position, orientation, and/or viewing angle, using any of the approaches discussed or suggested herein. For example, the device can determine 914, by analyzing at a second image acquired by the camera, a second viewing direction of the viewer with respect to the computing device. The device can then determine, for the subset of the plurality of planes of content, at least a second lateral offset corresponding to the second viewing direction. The device can then update 916 the display of the plurality of planes of content, each plane of the plurality of planes of content being displayed according to the respective first lateral position and the respective first depth position, the subset of the plurality of planes of content further being displayed according to the respective second lateral offset. As discussed, the image information can be manipulated (e.g., rotated, stretched, compressed, translated, etc.) to provide a consistent quasi-three-dimensional view as discussed elsewhere herein. As discussed, additional information can be added as well, such as shadowing from a nearby light source. In at least some embodiments, an application can attempt to provide consistency in the rendering and shading from any of a number of different viewing angles consistent with a three-dimensional display, even when the element used to display the image information is two-dimensional in nature.

For example, as discussed, the initial relative position can be determined using the image information, and changes in that relative position can be determined using a combination of the image information and the motion sensor information. For the current relative user point of view, the interface can be rendered such that a 2D representation of content is displayed on a display screen of the device. As described, the content can include one or more interface elements (e.g., planes of content), which can include a header, article text, at least one image, at least one link, advertisements, and various other links. When a change in orientation of the device is detected, a three-dimensional or multi-layer appearance, or other such aspect of at least a subset of the one or more interface elements can be rendered. This can include bringing an element "forward" in the rendering such that the element appears to be close to the surface of the display screen in a 3D display or quasi-three-dimensional rendering on a two-dimensional (2D) display screen. In accordance with various embodiments, bringing the element forward can involve, for example, adjusting a size, shape, shadowing, focus/blur, and/or coloring of the element. For example, interface elements can appear to be positioned and/or displayed in 3D space such that that certain interface elements (e.g., text, images, etc.) become larger in 3D depth and/or appear closer to a surface of a display screen of the computing device, while other interface elements (e.g., advertisements) "fall back" or appear smaller in 3D depth. As the user tilts, rotates, or otherwise changes the orientation of the device, the interface elements can move back and forth or otherwise change shape or appearance. When the user views the display screen from a default position (or within a default range of positions) with respect to the device, such as substantially in front of the display screen, a conventional view of the content can be displayed (e.g., the elements can be moved "backwards" or otherwise be rendered in 2D, such as by performing an opposite or alternative adjustment to that which was performed when the element was shown to be active and the rendering process for that interface can end).

Figure 10:
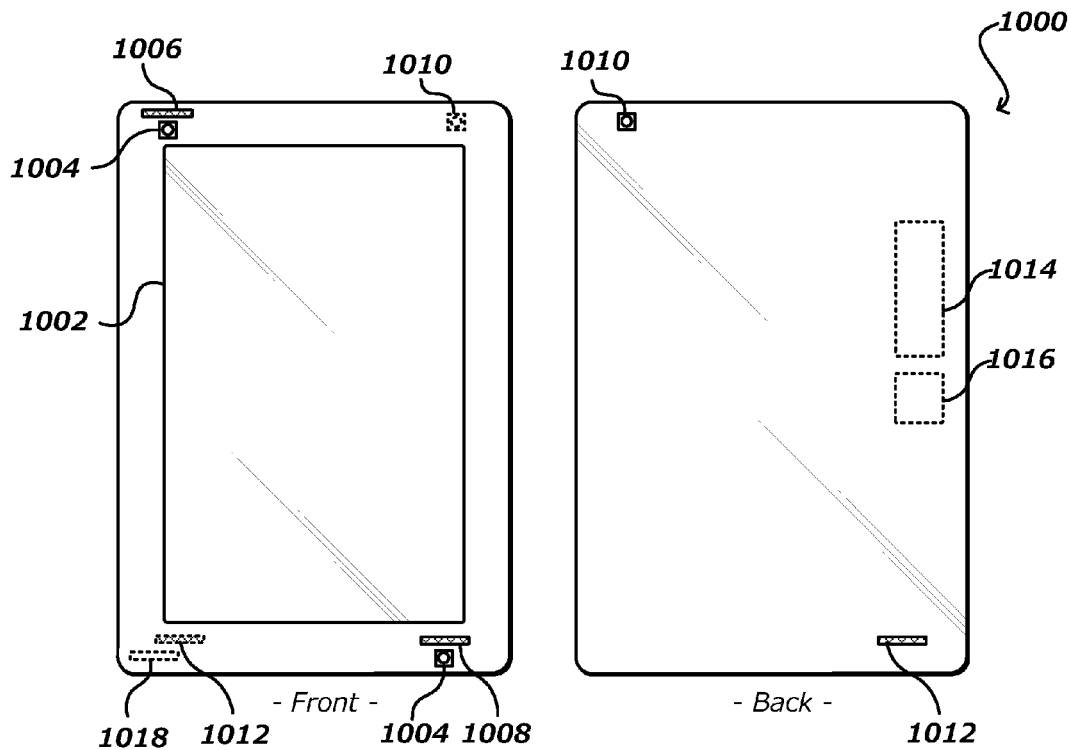
FIG. 10 illustrates an example device that can be used to implement aspects of the various embodiments.

FIG. 10 illustrates front and back views of an example electronic computing device 1000 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 1000 has a display screen 1002 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 1004 on the front of the device and at least one image capture element 1010 on the back of the device. It should be understood, however, that image capture elements could also, or alternatively, be placed on the sides or corners of the device, and that there can be any appropriate number of capture elements of similar or different types. Each image capture element 1004 and 1010 may be, for example, a camera, a charge-coupled device (CCD), a motion detection sensor or an infrared sensor, or other image capturing technology.

As discussed, the device can use the images (e.g., still or video) captured from the imaging elements 1004 and 1010 to generate a three-dimensional simulation of the surrounding environment (e.g., a virtual reality of the surrounding environment for display on the display element of the device). Further, the device can utilize outputs from at least one of the image capture elements 1004 and 1010 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 1008 on the front side, one microphone 1012 on the back, and one microphone 1006 on or near a top or side of the device. In some devices there may be only one microphone, while in other devices there might be at least one microphone on each side and/or corner of the device, or in other appropriate locations.

The device 1000 in this example also includes one or more orientation- or position-determining elements 1018 operable to provide information such as a position, direction, motion, or orientation of the device. These elements can include, for example, accelerometers, inertial sensors, electronic gyroscopes, and electronic compasses.

The example device also includes at least one communication mechanism 1014, such as may include at least one wired or wireless component operable to communicate with one or more electronic devices. The device also includes a power system 1016, such as may include a battery operable to be recharged through conventional plug-in approaches, or through other approaches such as capacitive charging through proximity with a power mat or other such device. Various other elements and/or combinations are possible as well within the scope of various embodiments.

Figure 11:
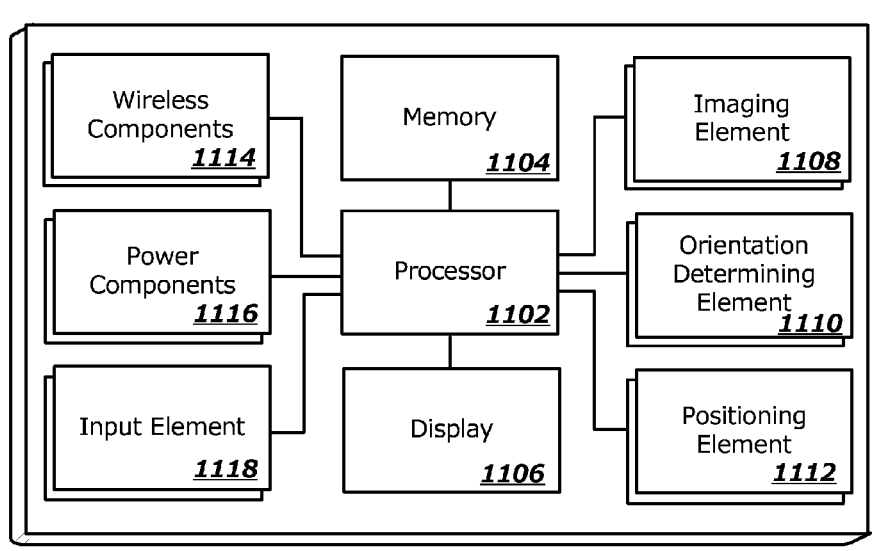
FIG. 11 illustrates example components of a client device such as that illustrated in FIG. 11.

FIG. 11 illustrates a set of basic components of an electronic computing device 1100 such as the device 1000 described with respect to FIG. 10. In this example, the device includes at least one processing unit 1102 for executing instructions that can be stored in a memory device or element 1104. As would be apparent to one of ordinary skill in the art, the device can include many types of memory, data storage, or computer-readable media, such as a first data storage for program instructions for execution by the processing unit(s) 1102, the same or separate storage can be used for images or data, a removable memory can be available for sharing information with other devices, and any number of communication approaches can be available for sharing with other devices.

The device typically will include some type of display element 1106, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1108, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1100 also includes at least one orientation determining element 1110 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1100. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1112 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 1114 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1116, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 1118 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user may either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Based on input received at the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 12A:
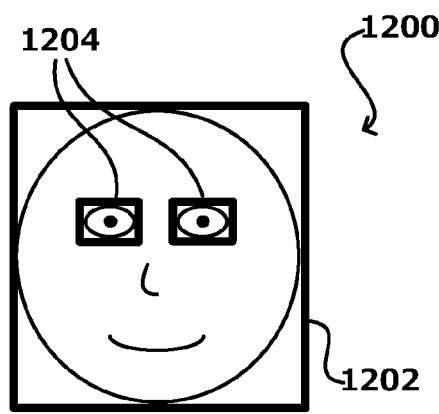
FIGS. 12(a)-12(f) illustrate example approaches to determining head position and/or gaze direction that can be used in accordance with various embodiments.

Various approaches can be utilized for locating one or more desired features of a user's face to determine various aspects useful for determining relative orientation. For example, an image can be analyzed to determine the approximate location and size of a user's head or face. FIG. 12(a) illustrates an example wherein the approximate position and area of a user's head or face 1200 is determined and a virtual "box" 1202 is placed around the face as an indication of position using one of a plurality of image analysis algorithms for making such a determination. Using one algorithm, a virtual "box" is placed around a user's face and the position and/or size of this box is continually updated and monitored in order to monitor relative user position. Similar algorithms can also be used to determine an approximate location and area 1204 of each of the user's eyes (or in some cases the eyes in tandem). By determining the location of the user's eyes as well, advantages can be obtained as it can be more likely that the image determined to be the user's head actually includes the user's head, and it can be determined that the user is facing the device. Further, the relative movement of the user's eyes can be easier to detect than the overall movement of the user's head when performing motions such as nodding or shaking the head back and forth. Monitoring box size also helps to provide distance information as well as directional information, which can be helpful when generating a three-dimensional model for modifying image information based on relative user position.

Figure 12B:
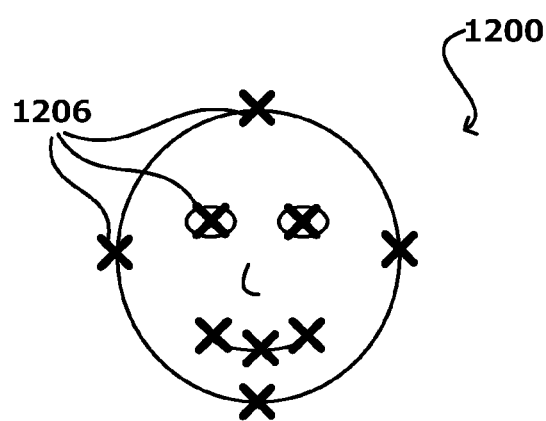

Various other algorithms can be used to determine the location of features on a user's face. For example, FIG. 12(b) illustrates an example wherein various features on a user's face are identified and assigned a point location 1206 in the image. The system thus can detect various aspects of user features and can determine more subtle changes in orientation. Such an approach provides advantages over the general approach of FIG. 12(a) in certain situations, as various other features can be determined, in case the user's eyes cannot be seen due to glasses, hair, etc.

Figure 12C:
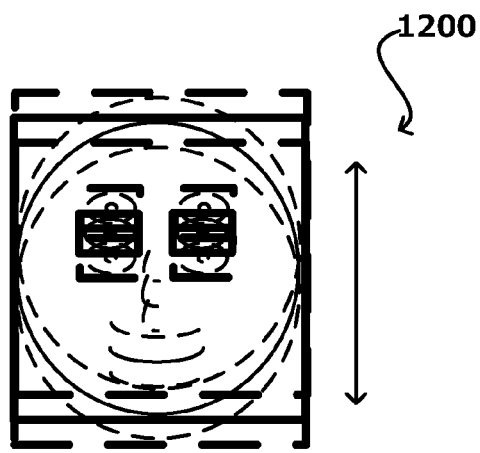
Figure 12D:
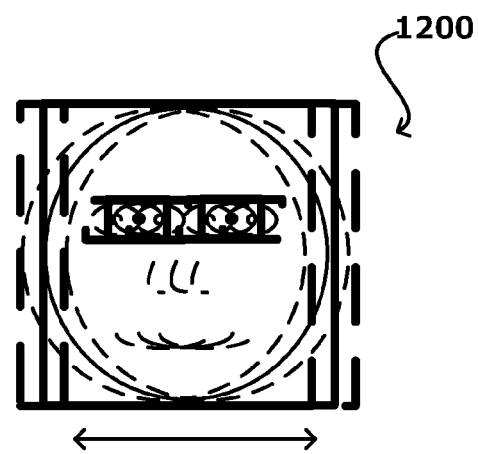
Figure 12E:
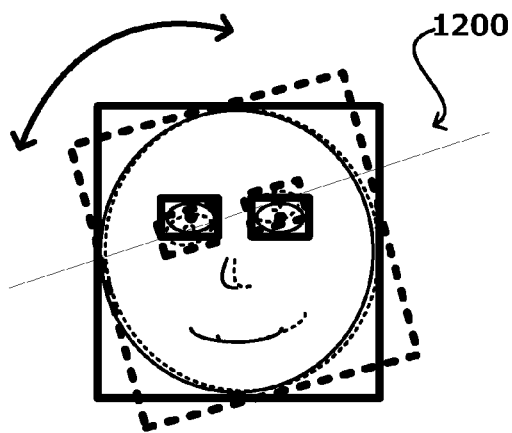
Figure 12F:
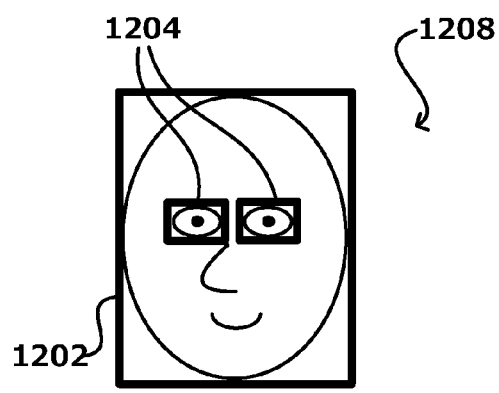

Once the positions of facial features of a user are identified, relative motion between the user and the device can be detected and utilized as input. For example, FIG. 12(c) illustrates an example where the user's head 1200 is moving up and down with respect to the viewable area of the imaging element. As discussed, this could be the result of the user moving his or her head, or the user moving the device up and down, etc. FIG. 12(d) illustrates a similar example wherein the user is moving right to left relative to the device, through movement of the user, the device, or both. As can be seen, each movement can be tracked as a vertical or horizontal movement, respectively, and each can be treated differently as an input to modify a displayed image. As should be understood, such a process also can detect diagonal or other such movements. FIG. 12(e) further illustrates an example wherein the user tilts the device and/or the user's head, and the relative change in eye position is detected as a rotation. In some systems, a "line" that corresponds to the relative position of the eyes can be monitored, and a shift in angle of this line can be compared to an angle threshold to determine when the rotation should be interpreted as input. FIG. 12(f) illustrates another advantage of using an approach such as that described with respect to FIG. 12(b) to determine the position of various features on a user's face. In this exaggerated example, it can be seen that the features of a second user's head 1208 have a different relative position and separation. Thus, the device also can not only determine positions of features for a user, but can distinguish between different users.

Figure 13A:
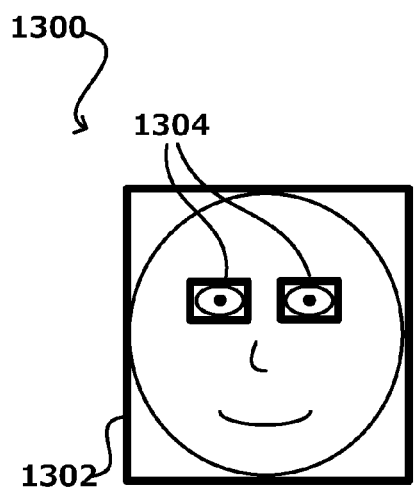
FIGS. 13(a) and 13(b) illustrate example approaches to determining changes in the relative distance to a user in accordance with various embodiments.
Figure 13B:
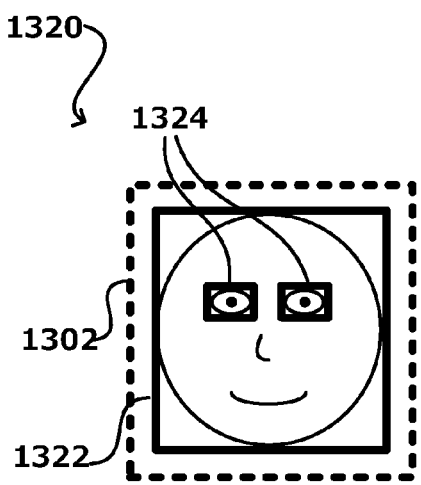

FIGS. 13(a) and 13(b) illustrate an example approach that can be used to determine variations in relative distance between a user and a device that can be used in accordance with various embodiments. As in FIG. 12(a), the approximate position and area of a user's head or face 1300 is determined and a virtual "box" 1302 is placed around the face at an initial distance as an indication of distance using one of a plurality of image analysis algorithms for making such a determination. If the user is known, the size of the user's head might be stored such that an actual distance to the user can be calculated based at least in part upon the size of the box 1302. If the user is not known, the distance can be estimated or determined using other factors, such as stereoscopic imaging. In some embodiments, determinations will be relative with respect to an initial box size when the actual distance cannot be determined As the distance between the user and the device changes, the size of the virtual box will change as well. For example, in FIG. 13(b) the distance between the user and the device has increased, such that the user's head 1320 appears smaller in the captured image information. Accordingly, the size of the virtual box 1322 for the adjusted size of the user's head is smaller than the original box 1302 for the initial distance. By monitoring adjustments in the size of the box or another measure of the user's head and/or other such features (e.g., boxes 1324), the device can determine an approximate distance and/or change in distance to the user. As discussed, this information can be used to adjust aspects of the displayed image information such as a level of zoom or amount of detail.

Figure 14A:
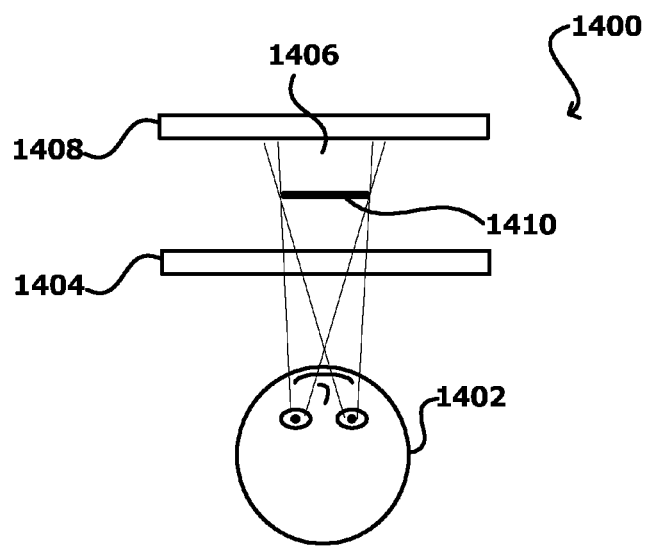
FIGS. 14(a)-14(d) illustrate example approaches to determining changes in the relative viewing angle for a user in accordance with various embodiments.
Figure 14B:
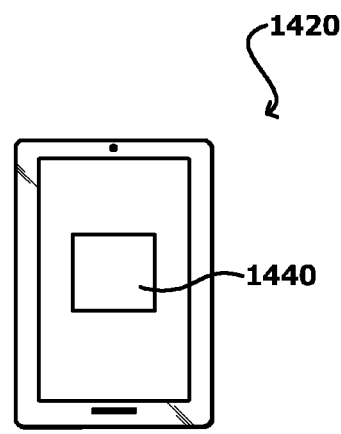
Figure 14C:
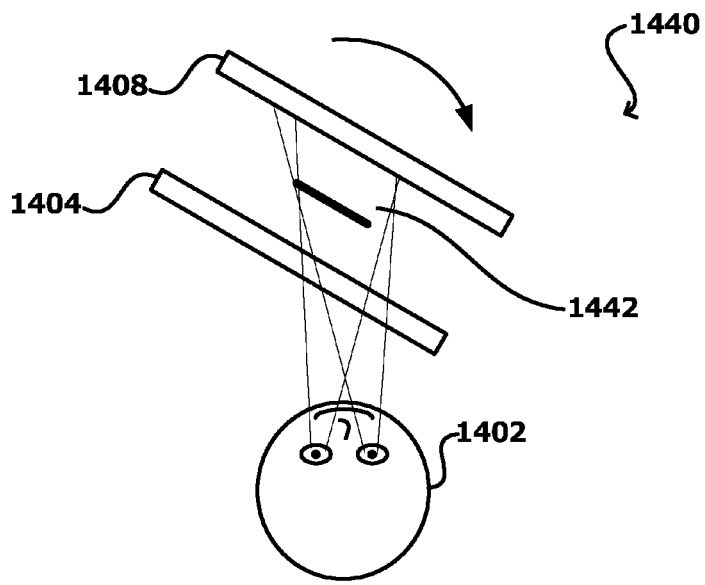
Figure 14D:
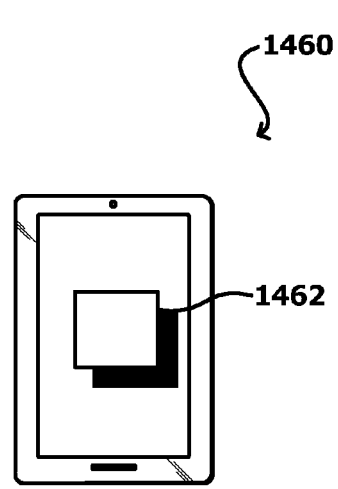

FIGS. 14(a) to 14(d) illustrate an example of how an interface plane or element at different depths can be used to generate viewing-angle appropriate images in accordance with at least some embodiments. In FIG. 14(a), the example orientation 1400 has a user 1402 substantially in front of a display element 1404 of a device. For simplicity of explanation, the interface plane or element here is represented in three dimensions, with a box 1406 on a background 1408. At the current viewing angle, the user is only able to see the top surface 1410 of the interface plane or element 1406, as illustrated in the display view 1420 of FIG. 14(b). In the orientation 1440 of FIG. 14(c), the device has been rotated (or the user has moved with respect to the device). To provide an appropriate user experience in at least some embodiments, the interface plane or element is effectively rotated with the device, such that the interface plane or element and background 1408 would rotate accordingly. Based on the current viewing direction of the user 1402, it can be seen in the display view 1460 of FIG. 14(d) that the viewable portion 1442 of the interface plane or element includes not only the top of the interface plane or element but at a level of depth (i.e., the interface plane appears to be closer to a display screen of the device). By calculating this angle, the application can determine the portions of the top and side of the interface plane or element to display as a result of the rotation. It also can be seen in FIG. 14(c) that any area occluded by the right side of the interface plane or element in FIG. 14(a) now can be seen, and that the area occluded by the left side of the box is interface plane or element greater in FIG. 14(c).

Figure 15A:
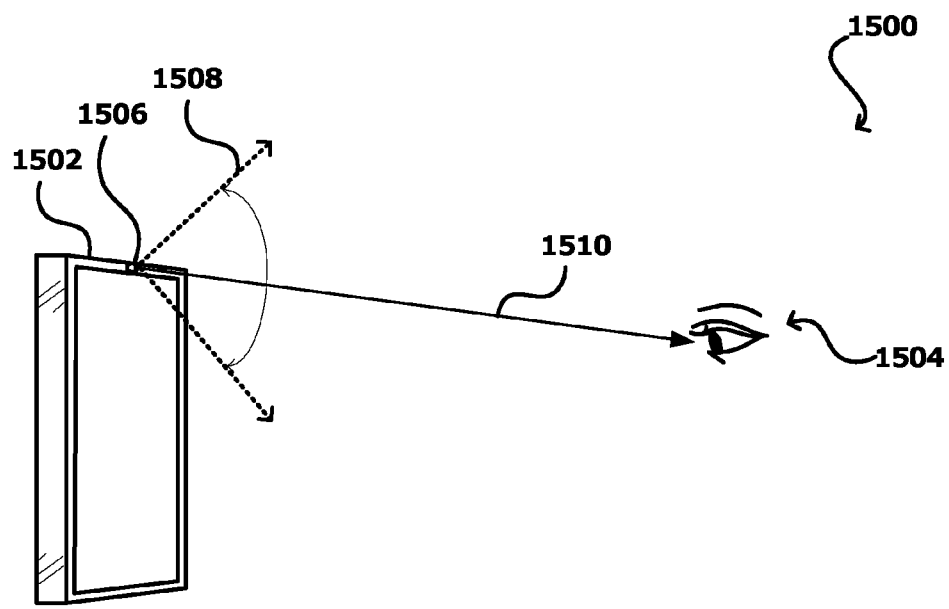
FIGS. 15(a) and 15(b) illustrate an example approach to determining the relative position of a user that can be utilized in accordance with various embodiments

In at least some embodiments, a computing device can utilize one or more cameras or other such sensors to determine the relative direction of the user. For example, FIG. 15(a) illustrates an example situation 1500 wherein a computing device 1502 is configured to utilize at least one camera element 1506 to attempt to locate a feature of a user, such as the user's head or eyes, for purposes of point of view determination. In this example, the user's eyes 1504 are located within the field of view 1508 of a camera of the computing device 1502. As discussed elsewhere herein, however, the point of view of a user can be determined using positions of the user's eyes, pupils, head, or other such features that can be indicative of at least a general point of view. In some embodiments, the device might look for an object held by or otherwise associated with a user to determine a general point of view for rendering. Further, in some embodiments a device might utilize at least two different cameras positioned on the device with a sufficient separation such that the device can utilize stereoscopic imaging (or anther such approach) to determine a relative position of one or more features, with respect to the device, in three dimensions. It should be understood that there can be additional imaging elements of the same or a different type at various other locations on the device as well within the scope of the various embodiments.

Software executing on the computing device (or otherwise in communication with the computing device) can obtain information such as the angular field of view of the camera, the zoom level at which the information is currently being captured, and any other such relevant information, which can enable the software to determine an approximate direction 1510 of at least one of the user's eyes with respect to the camera. In many embodiments, direction information will be sufficient to provide adequate point-of-view dependent rendering. In at least some embodiments, however, it can also be desirable to determine distance to the user in order to provide a more consistent and accurate rendering. In some embodiments, methods such as ultrasonic detection, feature size analysis, luminance analysis through active illumination, or other such distance measurement approaches can be used to assist with position determination. In other embodiments, a second camera can be used to enable distance determinations through stereoscopic imaging. Once the direction vectors from at least two image capture elements are determined for a given feature, the intersection point of those vectors can be determined, which corresponds to the approximate relative position in three dimensions of the respective feature as known for disparity mapping and other such processes.

Figure 15B:
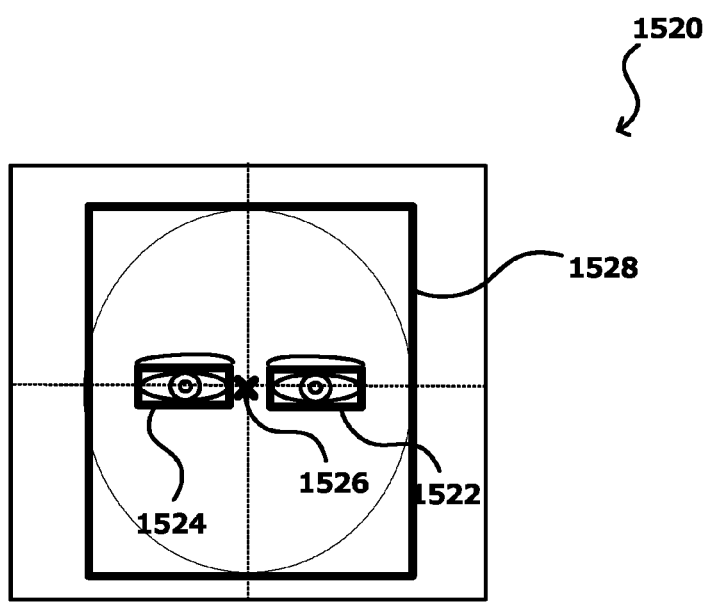

Further illustrating such an example approach, FIG. 15(b) illustrates an example image 1520 that could be captured of the user's head and eyes using the camera 1506 of FIG. 15(a). One or more image analysis algorithms can be used to analyze the image to perform pattern recognition, shape recognition, or another such process to identify a feature of interest, such as the user's eyes. Approaches to identifying a feature in an image, such may include feature detection, facial feature extraction, feature recognition, stereo vision sensing, character recognition, attribute estimation, or radial basis function (RBF) analysis approaches, are well known in the art and will not be discussed herein in detail. As illustrated in this example, both eyes of the user might be able to be located in the captured image information. At least some algorithms are able to determine an approximate location or region 1522, 1524 for each eye, or at least an approximate location 1528 of the user's head, where at least one of those locations or regions is used for point of view determinations. Depending on factors such as the desired level of sensitivity and distance between the user and the device, however, such information can impact the accuracy of the point of view determinations. Approaches in accordance with various embodiments can take advantage of the fact that the human brain combines and processes information from both eyes to provide a "single" point of view. Thus, the software can attempt to determine an intermediate point 1526 between the user's eyes to use for the user's point of view. Various other approaches can be used as well, such as are discussed elsewhere herein. Once a relative location is determined in the image information, the device can use information such as the field of view of the camera, the position of the camera with respect to the device, the zoom level of the camera, and other such information to determine a relative direction of the user, with that relative direction being used for the point of view to use in rendering the interface.

When using a camera to track location, however, the accuracy is limited at least in part by the frame rate of the camera. Further, images take some time to process such that there can be some lag in the determinations. As changes in orientation of the device can occur relatively quickly, it can be desirable in at least some embodiments to enhance the accuracy of the point of view determinations. In some embodiments, a sensor or other such element of a computing device can be used to determine motions of the computing device, which can help adjust point of view determinations. The sensors can be any appropriate sensors capable of providing information about rotations and/or translations of the device, as may include accelerometers, inertial sensors, electronic gyroscopes, electronic compasses, and the like.

Figure 16A:
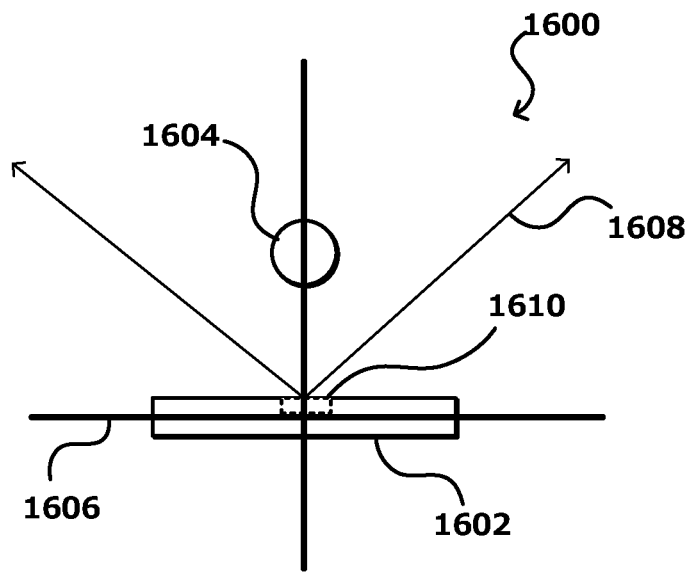
FIGS. 16(a) and 16(b) illustrate an example approach to determining device motion that can be utilized in accordance with various embodiments.
Figure 16B:
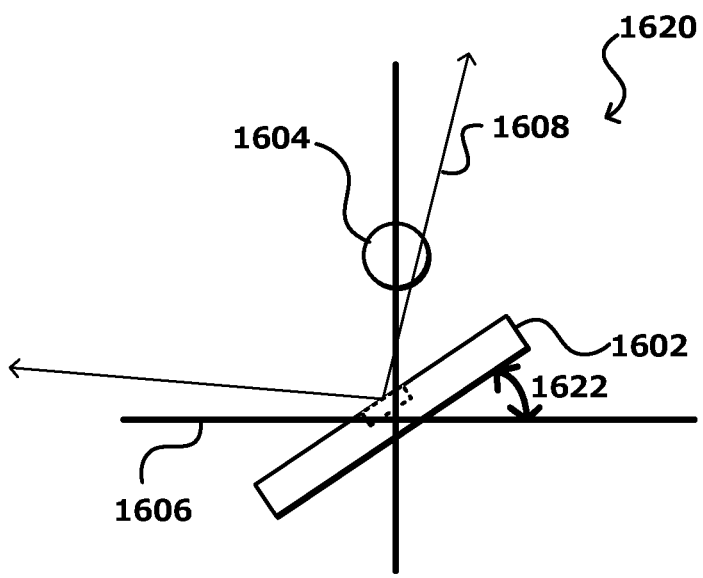

For example, FIG. 16(*a*) illustrates a "top view" 1600 of a computing device 1602 operable to capture an image of an object 1604 (e.g., a user's head) within an angular view 1608 of a camera 1610 of the computing device. In this example, the computing device 1602 includes at least one orientation- or rotation-determining element, such as an electronic compass or electronic gyroscope, that is able to determine a frame of reference 1606 in two or three dimensions with respect to a first orientation of the device. In at least some embodiments, an electronic compass might be used to determine an axis of the frame of reference 1606, as may correspond to a North direction, etc. In other embodiments, a component such as an electronic gyroscope might be calibrated periodically with a component such as a compass, but might instead determine changes in orientation along three axes of rotation over time. Various other approaches to determining changes in orientation along one, two, or three axes of rotation can be used as well within the scope of the various embodiments.

A first frame of reference 1606 or orientation can be determined at or near the time of capture of a first image by a camera 1610 of the computing device 1602. In some embodiments, the determination can be triggered by receiving input to capture an image or another such action, but in other embodiments the frame of reference and/or orientation information can be updated periodically, such as several times a second based upon the type and/or configuration of the electronic gyroscope. The gyroscope can also be any appropriate electronic gyroscope component, such as a conventional MEMS gyroscope used in various consumer devices. Approaches for implementing and obtaining orientation changes from such a gyroscope are well known in the art and, as such, will not be discussed in detail herein.

FIG. 16(*b*) illustrates a second top view 1610 after a change in orientation of the computing device 1602. The electronic gyroscope (or other such component or embedded sensor) can detect the change in orientation, in this example corresponding to a change in angle 1612 with respect to the frame of reference in the plane of the figure. The gyroscope can present information about the change in orientation in any appropriate form, such as in angles or radians of change for one, two, or three degrees (e.g., $\Delta x$, $\Delta y$, $\Delta z$), percentage changes in pitch, roll, and yaw, etc. In this example, the change in orientation is determined to be a given angular amount of rotation 1612 about a single axis. As illustrated, this causes the object 1604 to be moved to the right edge of the field of view 1608 of the camera 1610. In at least some embodiments, the gyroscope may not be accurate enough to provide an exact amount of rotation, but can provide an approximation or estimate of the amount of rotation that can be used to narrow the search space and facilitate the location of corresponding objects in the images. Further, the information can provide a faster adjustment or prediction of relative position than can be provided from the camera in at least some embodiments. A similar approach can be used for translation, although the effects of translation on objects in captured images can be much less significant than angular changes, such that the image information might be sufficient to account for translation changes in at least some embodiments.

Figure 17:
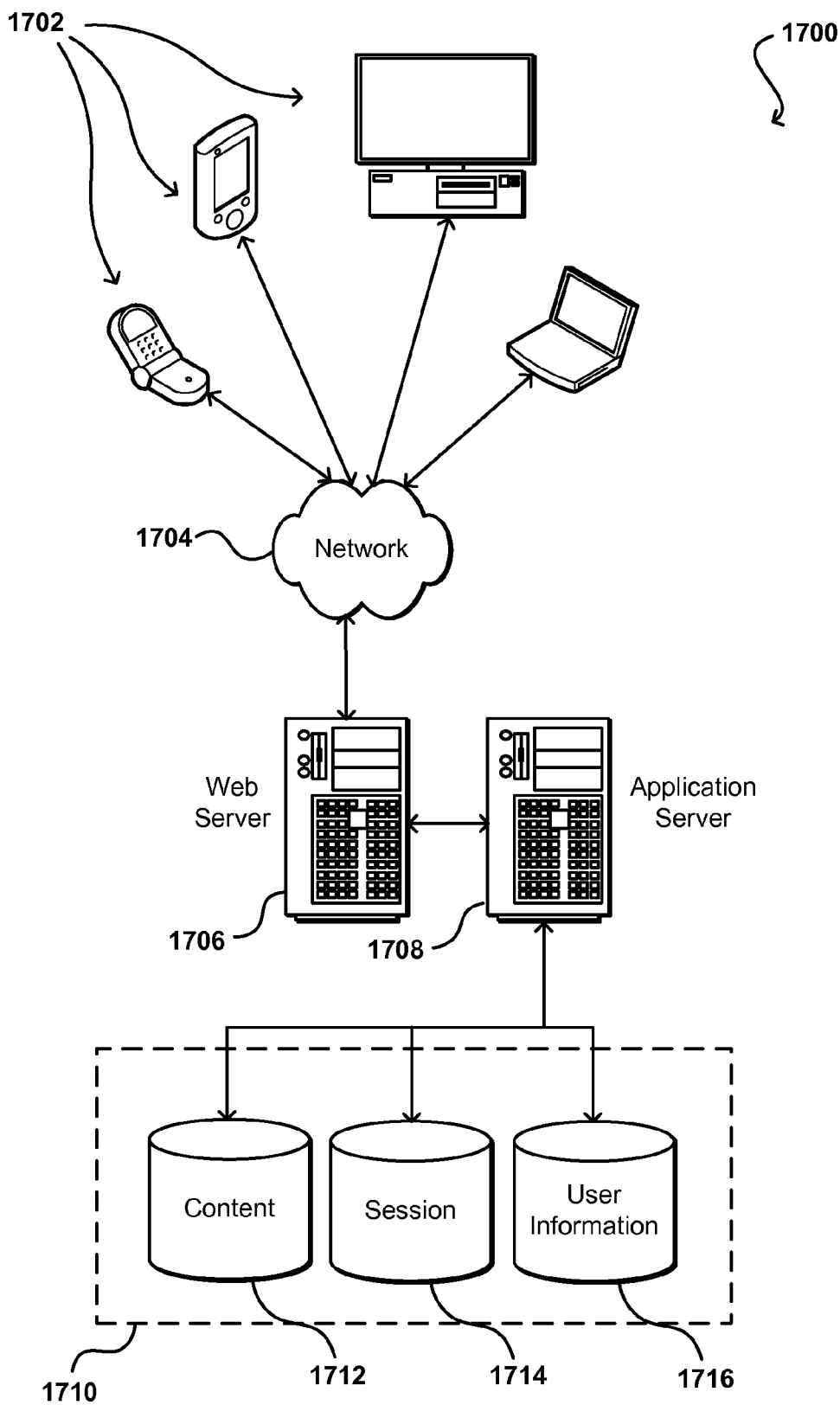
FIG. 17 illustrates an environment in which various embodiments can be implemented.

As discussed, different approaches can be implemented in various environments in accordance with the described embodiments. For example, FIG. 17 illustrates an example of an environment 1700 for implementing aspects in accordance with various embodiments. As will be appreciated, although a Web-based environment is used for purposes of explanation, different environments may be used, as appropriate, to implement various embodiments. The system includes electronic client devices 1718, 1720, 1722, and 1724, which can include any appropriate device operable to send and receive requests, messages or information over an appropriate network 1704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1706 for receiving requests and serving content in response thereto, although for other networks, an alternative device serving a similar purpose could be used, as would be apparent to one of ordinary skill in the art.

The illustrative environment includes at least one application server 1708 and a data store 1710. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1708 can include any appropriate hardware and software for integrating with the data store 1710 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1706 in the form of HTML, XML or another appropriate structured language in this example. The handling of all requests and responses, as well as the delivery of content between the client devices 1718, 1720, 1722, and 1724 and the application server 1708, can be handled by the Web server 1706. It should be understood that the Web and application servers are not required and are merely example components, as structured code discussed herein can be executed on any appropriate device or host machine as discussed elsewhere herein.

The data store 1710 can include several separate data tables, databases or other data storage mechanisms and media for storing data relating to a particular aspect. For example, the data store illustrated includes mechanisms for storing content (e.g., production data) 1712 and user information 1716, which can be used to serve content for the production side. The data store is also shown to include a mechanism for storing log or session data 1714. It should be understood that there can be other information that may need to be stored in the data store, such as page image information and access rights information, which can be stored in any of the above listed mechanisms as appropriate or in additional mechanisms in the data store 1719. The data store 1719 is operable, through logic associated therewith, to receive instructions from the application server 1708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 1718, 1720, 1722 and 1724. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 17. Thus, the depiction of the system 1700 in FIG. 17 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
  a display screen;
  a camera;
  at least one processor coupled to the display screen and the camera; and
  a memory device coupled to the at least one processor and including instructions that, when executed by the at least one processor, enable the computing device to:
    generate, using the camera, first image data representing a viewer of the computing device;
    determine, by analyzing the first image data, a first location of the viewer with respect to the computing device, the first location including at least distance information between the viewer and the display screen;
    display, based at least in part upon the first location of the viewer, a first plane of content on the display screen, the first plane of content having an associated first lateral position relative to the display screen and a first depth position relative to the display screen;
    generate, using the camera, second image data representing the viewer;
    determine, by analyzing the second image data, a second location of the viewer;
    determine, based at least in part upon the second location of the viewer, a first lateral offset with respect to a fixed pivot point at a center of the display screen for the first plane of content;
    generate a shifted first plane of content by shifting the first plane of content from the first lateral position to a second lateral position by an amount equal to the first lateral offset; and
    display, on the display screen, the shifted first plane of content.

2. The computing device of claim 1, wherein determining the first location of the viewer further comprises:
  locating a representation of the viewer in a first image captured by the camera; and
  determining the first location based at least in part upon a position of the representation of the viewer in the first image, an angular field of view of the camera, and a zoom level at which the first image is acquired.

3. The computing device of claim 1, further comprising:
  determining the first lateral offset for the first plane of content based at least in part upon a change in location of the viewer relative to the computing device from the first location to a second location and a depth position of the first plane of content relative to the display screen.

4. A computer implemented method under control of one or more computer systems configured with executable instructions that are executed by at least one processor, comprising:
  determining, by analyzing first image data representing a viewer of a computing device at a first time, a first location of the viewer with respect to the computing device, the first location including at least distance information between the viewer and a display screen of the computing device;
  determining, based at least in part on the first location, position information for a plurality of planes of content, the position information corresponding to a display position on the display screen of the computing device;
  displaying a first display of the plurality of planes of content on the display screen, the first display being rendered from a first perspective corresponding to the first location;
  determining a change in position of the computing device relative to the viewer of the display screen, based at least in part on analyzing the first image data and second image data representing the viewer at a second time;
  determining, by analyzing the second image data, a second location of the viewer corresponding to the change in position;
  determining, based at least upon the second location of the viewer, a shifted first plane of content, the shifted first plane of content laterally offset with respect to a fixed pivot point at a center of the display screen; and
  displaying the shifted first plane of content in a second display of the plurality of planes of content on the display screen, the second display being rendered from a second perspective corresponding to the second location.

5. The computer implemented method of claim 4, wherein displaying the first display and the second display further includes:
adjusting a scale and a translation for a respective plane of content of the plurality of planes of content based at least in part on the first or second location of the viewer relative to the display screen and a depth position of each plane of content of the plurality of planes of content relative to the display screen.

6. The computer implemented method of claim 4, wherein displaying the first display and the second display further includes:
rendering at least one plane of content of the plurality of planes of content to appear closer to the viewer of the display screen relative to at least one other plane of content of the plurality of planes of content.

7. The computer implemented method of claim 4, wherein displaying the second display of the plurality of planes of content further includes:
providing a display of a second plane of content of the plurality of planes of content previously occluded by a plane of content of the plurality of planes of content.

8. The computer implemented method of claim 4, further comprising:
assigning a first plane of content of the plurality of planes of content to a first depth position; and
assigning a second plane of content of the plurality of planes of content to a second depth position, the first depth position being different from the second depth position;
wherein a change from a first lateral position to a second lateral position for each of the first plane of content and the second plane of content is based at least in part upon the first depth position for the first plane of content, the second depth position for the second plane of content, and a location of the viewer relative to the computing device.

9. The computer implemented method of claim 4, wherein the position information includes a first lateral position and a first depth position relative to the display screen, the method further comprising:
determining a first lateral offset based at least in part upon the first location of the viewer,
wherein displaying the first display of the plurality of planes of content includes, displaying, on the display screen, the plurality of planes of content, a first plane of content of the plurality of planes of content being displayed according to the first lateral position and the first depth position, the first plane of content further being displayed according to the first lateral offset.

10. The computer implemented method of claim 9, wherein a second lateral offset is determined based at least in part upon a change in location of the viewer relative to the computing device from the first location of the viewer to the second location of the viewer relative to the computing device.

11. The computer implemented method of claim 4, further comprising:
adjusting an appearance of at least one of the plurality of planes of content according to the first location of the viewer or the second location of the viewer,
wherein adjusting the appearance of the at least one of the plurality of planes of content includes adjusting at least one of a size, shape, color, shading, or blur of the at least one of the plurality of planes of content according to at least one of the first location of the viewer or the second location of the viewer.

12. The computer implemented method of claim 4, wherein each plane of the plurality of planes of content corresponds to a node of a plurality of nodes of a hierarchy, the method further comprising:
generating a node hierarchy, the node hierarchy including the plurality of nodes, wherein each node of a subset of the plurality of nodes are associated with one of the plurality of planes of content, and wherein each node of the subset of the plurality of nodes reference relative position information and absolute position information used to render a perspective of the plurality of planes of content,
wherein the absolute position information corresponds to a lateral position on the display screen and a depth position on the display screen, and wherein the relative position information corresponds to a relative position of a first plane of content of the plurality of planes of content to a second plane of content the plurality of planes of content.

13. The computer implemented method of claim 4 further comprising:
detecting a change in an orientation of the computing device with respect to the viewer of the display screen;
determining, based at least in part on the orientation of the computing device and the position information of the plurality of planes of content, a set of transformation equations to adjust a scale and a translation for a respective plane of content with respect to a pivot point at a center of the display screen; and
adjusting an appearance of at least one of the plurality of planes of content using the set of transformation equations.

14. The computer implemented method of claim 4, wherein each plane of the plurality of planes of content corresponds to a node of a plurality of nodes of a hierarchy, and wherein the plurality of nodes of the hierarchy include at least one parent node and one or more child nodes depending from the at least one parent node.

15. The computer implemented method of claim 4, wherein the position information includes a lateral position and a depth position relative to the display screen, the method further comprising:
displaying, on the display screen, the plurality of planes of content, each plane of content of the plurality of planes of content being displayed according to its respective lateral position and depth position.

16. A computing device, comprising:
a display screen;
a camera;
at least one processor coupled to the display screen and the camera; and
a memory device coupled to the at least one processor and including instructions that, when executed by the at least one processor, enable the computing device to:
generate, using the camera, first image data representing a user of the computing device;
determine, by analyzing the first image data, a first location of the user with respect to the computing device, the first location including at least distance information between the user and the computing device;
determine a display position on the display screen of the computing device for a first plane of content;
display, based at least in part on the first location, a first display of the first plane of content on the display screen, the first display being rendered from a first perspective corresponding to the first location;

determine a change in position of the computing device relative to the user of the display screen, based at least in part on analyzing the first image data and second image data representing the user at a second time;

determine, by analyzing the second image data, a second location of the user corresponding to the change in position;

determine, based at least upon the second location of the user, a shifted first plane of content, the shifted first plane of content laterally offset with respect to a fixed pivot point at a center of the display screen; and display a second display with the shifted first plane of content on the display screen, the second display being rendered from a second perspective corresponding to the second location.

17. The computing device of claim 16, wherein the instructions, when executed, further cause the computing device to:

display a second plane of content previously occluded by the first plane of content.

18. The computing device of claim 17, wherein the first plane of content appears closer to the user of the display screen relative to the second plane of content.

19. The computing device of claim 16, wherein the instructions, when executed, further cause the computing device to:

adjust an appearance of the first plane of content according to the first location of the user relative to the computing device, wherein adjusting the appearance of the first plane of content includes adjusting at least one of a size, shape, color, shading, or blur of the first plane of content according to at least one of the first location of the user or the second location of the user.

* * * * *